United States Patent
Turntine

(10) Patent No.: US 12,205,054 B1
(45) Date of Patent: *Jan. 21, 2025

(54) AUTOMATED SYSTEMS FOR RECREATIONAL VEHICLE PARKING FACILITY

(71) Applicant: James Dean Turntine, Sullivan, MO (US)

(72) Inventor: James Dean Turntine, Sullivan, MO (US)

(*) Notice: Subject to any disclaimer, the term of this patent is extended or adjusted under 35 U.S.C. 154(b) by 465 days.

This patent is subject to a terminal disclaimer.

(21) Appl. No.: 17/567,293

(22) Filed: Jan. 3, 2022

Related U.S. Application Data

(63) Continuation-in-part of application No. 17/245,266, filed on Apr. 30, 2021, now Pat. No. 11,215,958.

(60) Provisional application No. 63/018,441, filed on Apr. 30, 2020.

(51) Int. Cl.
*G06Q 10/02* (2012.01)
*B60L 53/66* (2019.01)
*G06Q 50/06* (2024.01)
*G08G 1/14* (2006.01)

(52) U.S. Cl.
CPC ............ *G06Q 10/02* (2013.01); *B60L 53/665* (2019.02); *G06Q 50/06* (2013.01); *G08G 1/148* (2013.01)

(58) Field of Classification Search
CPC ...... G06Q 10/02; G06Q 50/06; B60L 53/665; G06G 1/148
USPC ........................................................ 700/295
See application file for complete search history.

(56) References Cited

U.S. PATENT DOCUMENTS

| | | | |
|---|---|---|---|
| 4,519,657 | A | 5/1985 | Jensen |
| 5,432,508 | A | 7/1995 | Jackson |
| 5,451,755 | A | 9/1995 | Duval et al. |
| 6,002,340 | A | 12/1999 | Smith |
| 6,510,608 | B1 | 1/2003 | Marshall et al. |
| 6,844,716 | B1 | 1/2005 | Lundberg et al. |

(Continued)

OTHER PUBLICATIONS

Russ and Tina De Maris Dump Station Etiquette [online]. RV Life, Jul. 6, 2017. Retrieved from the Internet: <URL:https://rvlife.com/dump-station-etiquette/>.

(Continued)

*Primary Examiner* — Md Azad
(74) *Attorney, Agent, or Firm* — Carmody MacDonald P.C.; Dennis J M Donahue, III; Kevin C. Staed

(57) ABSTRACT

The automated system provides automated and remote monitoring, control, communication, and management of recreational vehicle parking facilities, providing guests access to electric, water and sewer services via onsite hookup pedestals. Guests use a computerized reservation system to reserve a parking site. The reservation information is provided to the control system for the hookup pedestals. The control system monitors parking site sensors and activates and deactivates the hookup pedestals via smart switches based on the reservation information and sensor data indicating an arrival and departure, respectively. When a reservation window ends or the site is vacated, the system deactivates the hookup pedestals to end access to the utility services while the sensors remain active. When sites are vacated early, the system determines whether there is sufficient time until the next reservation include the sites' open time to the reservation system's inventory of open sites that are available for new reservations.

20 Claims, 7 Drawing Sheets

(56) References Cited

U.S. PATENT DOCUMENTS

| | | | |
|---|---|---|---|
| 6,850,898 B1 | 2/2005 | Murakami et al. | |
| 7,181,426 B2 | 2/2007 | Dutta | |
| 7,252,227 B2 | 8/2007 | Chase | |
| 7,818,190 B1 | 10/2010 | Sutherland | |
| 8,381,751 B2 | 2/2013 | Bartolotta | |
| 8,624,428 B2 | 1/2014 | Hurst et al. | |
| 9,010,358 B2 | 4/2015 | Bartolotta | |
| 9,048,636 B2 | 6/2015 | Borden et al. | |
| 9,057,453 B2 | 6/2015 | Pitchford et al. | |
| 9,779,365 B2 | 10/2017 | Smullin et al. | |
| 10,414,357 B1 | 9/2019 | Sorensen | |
| 10,476,253 B2 | 11/2019 | Easton et al. | |
| 2003/0004792 A1 | 1/2003 | Townzen et al. | |
| 2004/0236615 A1 | 11/2004 | Msndy | |
| 2004/0254840 A1* | 12/2004 | Slemmer | G06Q 30/0633 705/28 |
| 2005/0098627 A1 | 5/2005 | Chase | |
| 2007/0045411 A1 | 3/2007 | Honingford et al. | |
| 2008/0304212 A1 | 12/2008 | Seff et al. | |
| 2012/0127308 A1* | 5/2012 | Eldershaw | G08G 1/147 340/932.2 |
| 2014/0085109 A1* | 3/2014 | Stefik | G06Q 10/02 340/932.2 |
| 2014/0089016 A1* | 3/2014 | Smullin | G06Q 10/02 705/5 |
| 2015/0324709 A1* | 11/2015 | Krivacic | G06Q 10/02 705/5 |
| 2019/0385097 A1* | 12/2019 | Hussain | G06Q 10/02 |
| 2022/0309465 A1* | 9/2022 | Scheidegger | G06Q 10/06315 |

OTHER PUBLICATIONS

US Military Campgrounds and RV Parks [online]. Military Camp Grounds, Apr. 19, 2020. Retrieved from the Internet: <URL:https://www.militarycampgrounds.us/massachusetts/uscg-cape-cod-mwr- . . . 1>.

STL RV Park [online]. StLouis RV Park, Mar. 30, 2020. Retrieved from the Internet: <URL:https://stlouisrvpark.com/accommodations/>.

\* cited by examiner

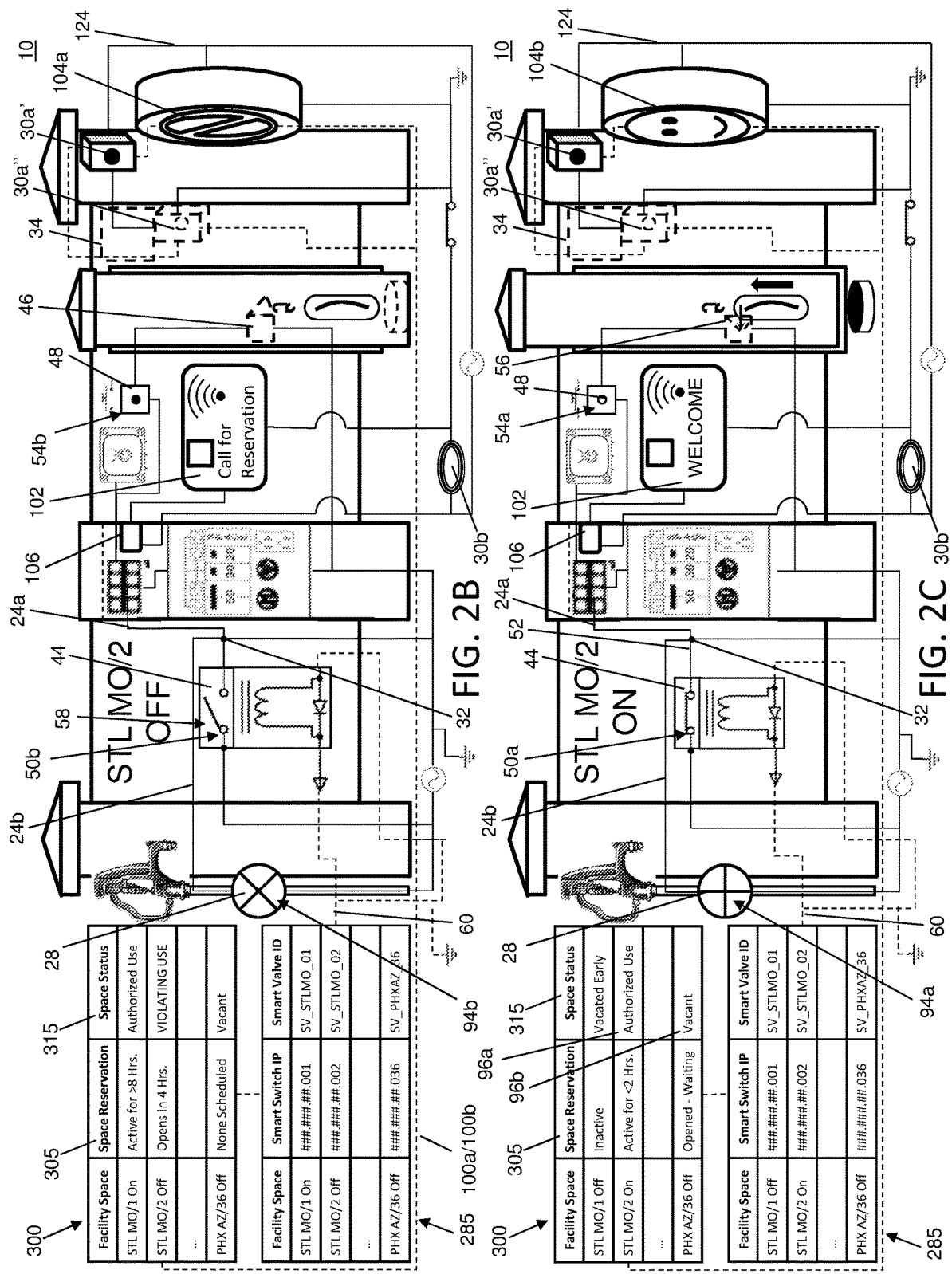

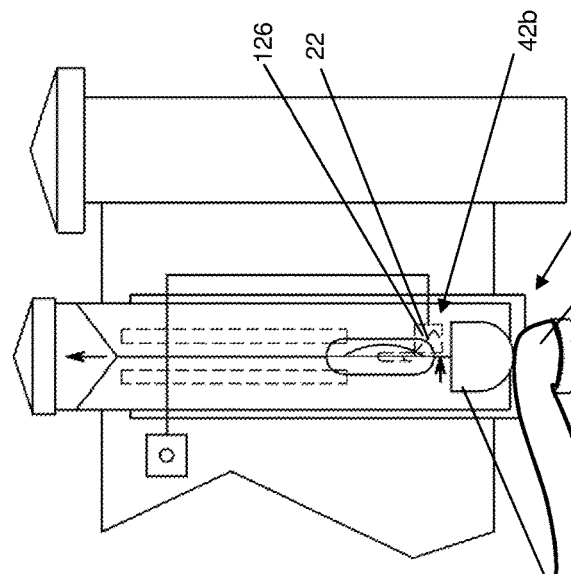
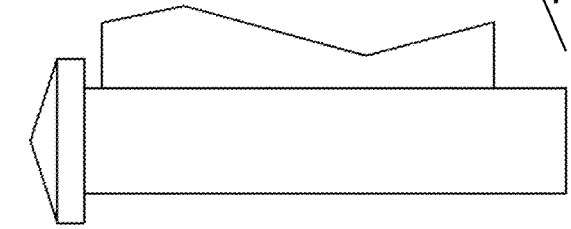
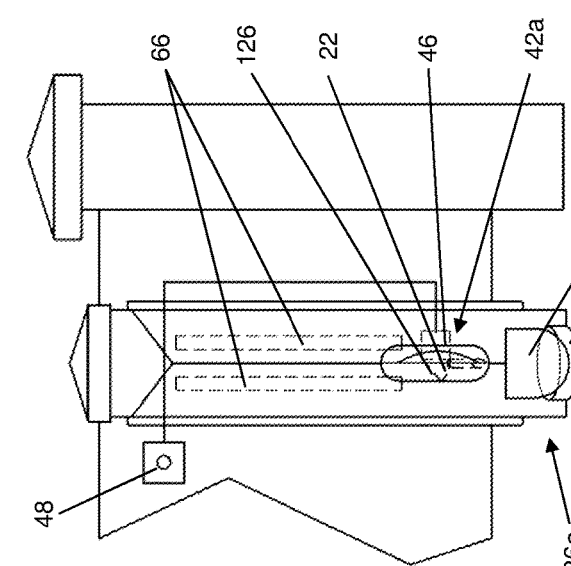
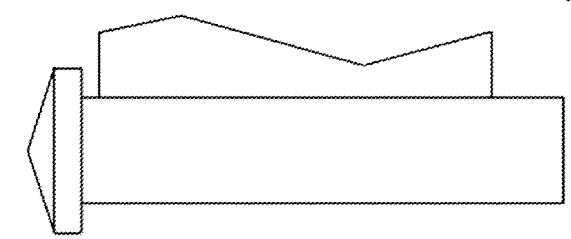
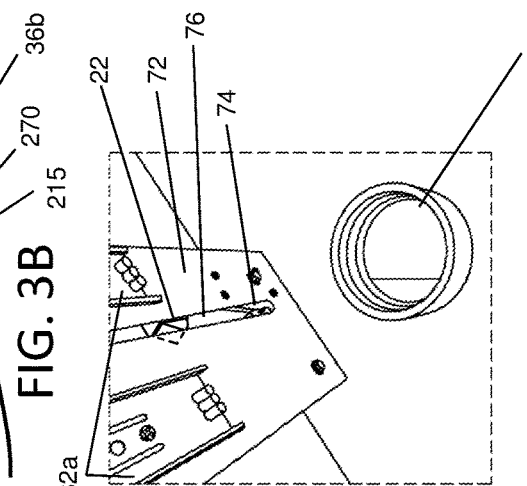
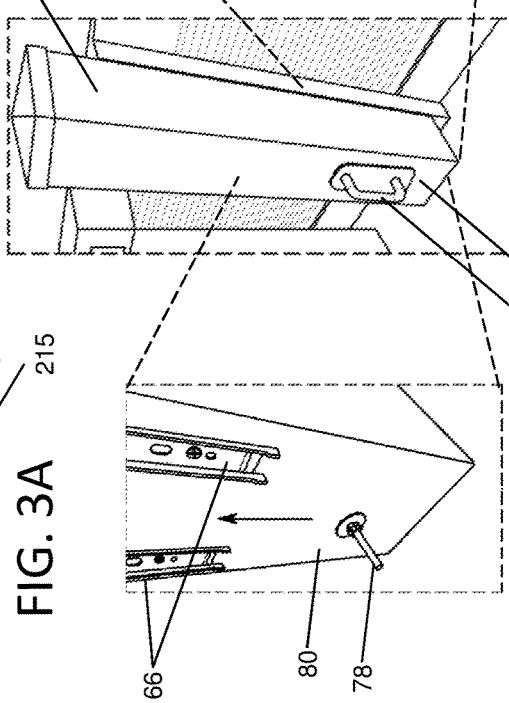

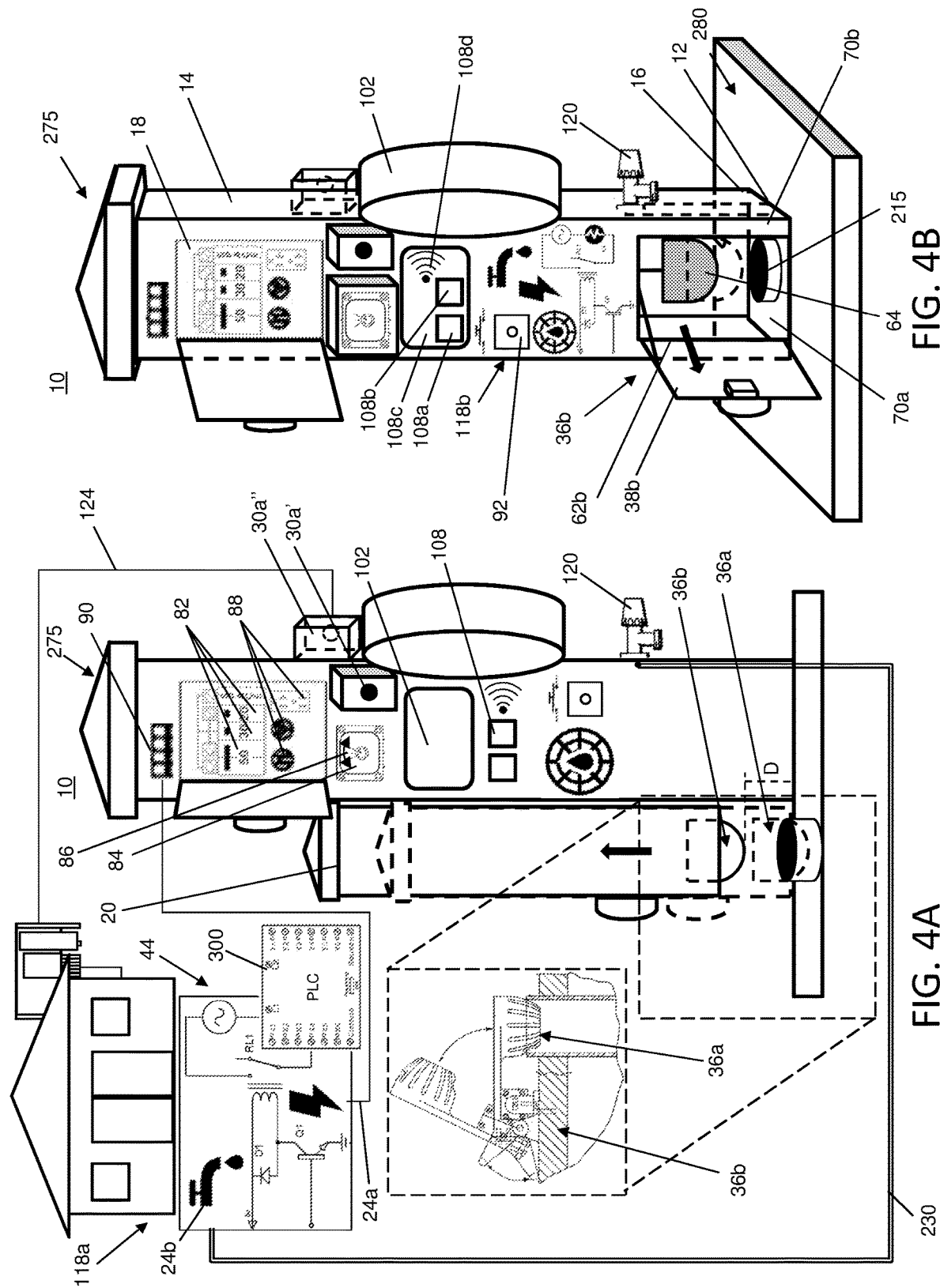

AUTOMATED SYSTEMS FOR RECREATIONAL VEHICLE PARKING FACILITY

CROSS-REFERENCE TO RELATED APPLICATIONS

This application is a continuation-in-part of U.S. patent application Ser. No. 17/245,266 filed on Apr. 30, 2021 which claims priority from U.S. Provisional Pat. App. Ser. No. 63/018,441 filed on Apr. 30, 2020, respectively, which are hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to methods and systems for remotely reserving and managing recreational vehicle parks, and more particularly to automated services provided by hookup pedestals and remote control systems for activating and deactivating the utility services provided by the hookup pedestals.

Related Art

Traditional parking facilities for recreational vehicles (RVs) have multiservice hookup pedestals which provide utility services with connections to electrical power, potable water, and sewer access. Examples of multiservice hookup pedestals are described in U.S. Pat. Nos. 6,844,716 and 9,048,636 which are incorporated by reference. Additionally, many of these RV parking facilities have automated reservation systems that allow guests to select a parking site with arrival and departure times and to pay in advance for the period of time that the parking site is being rented. Most of these RV parking facilities have an onsite manager, attendant or other staff who can prevent unauthorized users (freeloaders) from accessing parking sites that have been reserved by the paying guests and who direct the guest to their reserved parking site. The attendant may also activate the utility services that are provided through the particular hookup pedestal for the reserved parking site. As explained below, some hookup pedestals also allow for self-service operation with an automated activation when a user is at the parking facility and pays for the parking site through a local terminal. These self-service hookup pedestals allow the user to activate the utility services for a period of time without the need for an onsite attendant, but they are not integrated with an automated reservation system.

Parking facilities have used automated and remote monitoring with reservation systems and self-service-payment kiosks for decades, and these parking facilities have incorporated sensors that detect the locations of vehicles in parking spaces and/or the occupancy status of particular parking spaces, such as disclosed in U.S. Pat. No. 5,432,508. Parking facilities have also been known to include self-service hookup pedestals that provide utility services, such as the electrical power hookup pedestals in U.S. Pat. No. 5,451,755 which suggests the benefits of providing an electric power outlet for trailer camping. Similarly, US Pat. App. Pub. No. 2008/0304212 discloses an automated self-service hookup pedestal for electrical services which can be operated by a driver who pulls into the RV parking facility. However, the '755 Patent and '212 Application require payment at a local kiosk or central transaction interface point in order to activate the utility services through the hookup pedestal, and there is no system which integrates the automated reservation and parking system functionality with the activation of multiservice hookup pedestals corresponding with respective reservations. Accordingly, modifications would need to be made to automated parking facilities with reservation systems to integrate multiservice hookup pedestals that are activated when a guest arrives without any need for an attendant; additionally, for such an integration, known hookup pedestals would also have to be modified.

Even with the advances and innovations that have been made to automate the management of recreational vehicle parking facilities, there has remained a need for improved hookup pedestals that can be integrated with automated reservation and remote control systems. In addition to the automated self-service hookup pedestals for electric power referred to above, there have also been self-service hookup pedestals for other utility services, such as sewer service. For example, U.S. Pat. No. 9,010,358 discloses a self-service control panel that operates a locking inlet cover for an automated dump station. According to the '358 Patent, the inlet cover has an electrically powered latching mechanism, and when a payment is made, the control panel powers the latching mechanism so that it is unlocked for a short, limited period of time which gives the user sufficient time to open the inlet cover and connect the end of the RV's waste hose into the dump station's inlet tube in the space between the open inlet cover and the inlet tube (on the order of a couple of minutes). When the waste hose is connected to the inlet tube, it prevents the inlet cover from closing which is critical because at the end of the short time period the latching mechanism is moved back to its locked configuration, and the entire operation to empty the RV's waste tank(s) takes longer than the short time period provided for opening the inlet cover and placing the waste hose into position over the inlet tube.

The '358 Patent is particularly directed to an automated dump station that is separate from the RV parking site which has the hookup pedestal that is used for ongoing utility services while the RV is parked for a long period of time, on the order of hours, days, or weeks. Accordingly, the self-service, automated dump station service disclosed in the '358 Patent is not integrated with the other utility services. If the self-service, automated dump station were to be integrated into a hookup pedestal with other utility services that are rented for hours, days or weeks, it is likely that the renter might want to empty the waste tanks at the beginning of the rental period as well as towards the end of the rental period, and for the longer rental periods, the waste tanks may need to be emptied multiple additional times. Without modification to the '358 Patent's dump station service, even if the inlet cover is unlocked for the first couple of minutes of the rental period and is opened during this short time for the initial placement of the waste hose, the renter would have to make additional payments for subsequent evacuations or would have to wedge the inlet door open which would allow odiferous and noxious fumes to escape from the waste pipe. Wedging the inlet door open is also risky for the facility operator because while the renter may be on an excursion during the rental period, if the renter has wedged the inlet door open, a freeloader could use the dump station at the parking site. Accordingly, there remains a need to modify hookup pedestals so that all of the utility services are active and available for the entire duration of the rental period.

In a number of different industries, smart switches, such as disclosed in U.S. Pat. No. 6,002,340 which is incorporated by reference, have been integrated in a number of innovative ways with programmable logic controllers (PLCs), micro-controllers, sensors, and different types of electrically powered motors, solenoids, and other actuators for operating latches, valves, and other mechanisms that are used in control systems to provide automated, remote control operation for equipment corresponding to the particular industries. Although smart switches and sensors have been used for decades to remotely control electrical power systems, electronic communication systems, potable water systems, and sewage systems, the limited uses of smart switches and sensors in hookup pedestals have mostly focused on self-service systems in which a single utility service is automatically activated at the time that a payment is made at the hookup pedestal or at a central processing location at the particular parking facility. As indicated above, currently known self-service hookup pedestals cannot be integrated into automated reservation and remote control systems for multiple parking facilities without modifying their operation. Accordingly, there has also remained a need for improved hookup pedestals that can be distributed in one or more RV parking facilities and function in coordination with a central command console that manages the automated reservation system as well as the remote control systems.

Another problem with service pedestals prior to the present invention is their inability to automatically monitor operating conditions for the service pedestals and report operational parameters when they are outside predefined thresholds for normal operation. Without automated monitoring and comparisons to thresholds for normal operation, periodic maintenance checks could be performed to determine whether pedestal services are functioning properly or could be degrading towards a failure or may have already failed, or the facility management could wait until guests identify operational problems and/or failures. Accordingly, there is another desire in the RV parking industry to provide an improved service pedestal that monitors and reports operational parameters to attendants for the facilities with warnings for service pedestals with operational conditions outside the thresholds so they can coordinate corrective actions that may be required. It would be a further benefit to incorporate pedestal accessories that support the services being provided through the pedestal and an automated control system that can automatically take corrective action to avoid some issues. For example, a particular problem exists when water lines and spigots are susceptible to freezing when exposed to harsh cold temperatures for extended periods of time, such as in northern climates during winter months. A common frost-proof hydrant design situates the control valve beneath the known freeze-line depth of the particular area where the hydrant is used. In operation, this configuration allows water to flow through the valve and out of the distribution pipe, above the freeze-line, when the valve is opened. Subsequently, when the valve is closed water within the distribution pipe above the freeze-line drains from the pipe such that no water is within the pipe above the freeze-line when the valve is closed. However, a problem arises when a hose or spray nozzle remains connected to the end of the distribution pipe and water is trapped within the distribution pipe above the freeze-line. Thus, there is a desire to provide an improved design which protects against uneducated users who do not realize that a frost-proof hydrant cannot work when connected to a hose, such as an RV water line, that is not calling for water. As another example, if there is a blockage in the inlet to the sewer lines, there may not be any warning to the attendant or a user if there is no fluid level sensor in the inlet.

Preferably, the improved hookup pedestals would provide for multiple utility services, particularly including electrical power systems, potable water systems, and sewage systems, which can be all be activated or deactivated based on the reservation information maintained by central command console as well as sensor information and/or user input from each particular hookup pedestal. It would be preferable for all of the utility service to be activated and deactivated automatically upon arrival and departure, respectively, of the guests who are the users of the services while the parking facilities are remotely managed and overseen by off-site staff without any onsite staff required. Although wireless communications may also be provided through the improved hookup pedestals, it is less important than electrical power, potable water, and sewer connections because of the ubiquitous use of smartphones over expansive mobile phone networks and ability to use a smartphone as a personal hotspot. Accordingly, in remote locations, it may be more beneficial to ensure the RV parking facility is within the operable range of a mobile phone tower or to build one as a part of the infrastructure for the RV parking facility.

SUMMARY OF THE INVENTION

The invention described herein is an automated system providing remote monitoring, control, communication, and management of a recreational vehicle parking facility and provides guests access to electric, water and sewer services via onsite hookup pedestals. In operation, the system enables a guest to make a reservation and contract and pay for a parking site that has a hookup pedestal for electric, water, and sewer services and subsequently access the same without the need for onsite assistance. The parking facility itself includes a physical infrastructure including electrical lines, potable water mains, sewer waste pipes, lighting towers, wireless communication stations, video cameras as well as the roads and the RV parking spaces. To provide remote access for each guest at the various sparking sites, each parking space includes an adjacent multiservice hookup pedestal capable of providing at least one of electric, water and sewer services to the guest.

The system is fully automated and does not necessitate manual intervention by staff yet protects against unknown and unwanted guests using electric, water, and sewer services. Each parking space is continually monitored by local sensors capable of detecting when a vehicle is present in a space to allow the host computer system to determine if a guest is properly occupying the space during a reserved stay or if the space should be vacated. In addition to providing various utility services, the hookup pedestals may also include communication interfaces that allow the host computer system to automatically communicate with the guest to confirm their reservation, notify them if they are in the wrong space, or warn that they are present without a reservation and action may be taken against them. In operation, these local sensors operate on a continuously closed circuit and thereby monitor each space separate from the power circuits operating the hookup pedestals. Accordingly, even if a guest is parked in a space without a reservation, they cannot use any of the utility services which are only activated once the guest is verified by the system.

Provided it is determined that a guest is properly parked in their assigned space, the host system sends instructions to programmable logic controllers (PLC) corresponding with the hookup pedestal and subsequently activate the same on an electrical circuit separate from the local sensors. Thus, until instructions are sent by the PLC, no power is provided to the hookup pedestal and water, electric and sewer services are unusable. Once instructions are provided, a smart switch closes the power circuit to power an electrical panel that can subsequently be used by the guest to deliver power to their RV or for any other need they may have. Similarly, another smart switch may activate a smart water valve to open the valve and allow water to flow at various rates from the water hydrant. Finally, the smart switch may also power a manual switch that is in operative communication with a sewer inlet cover latch. Once operational, the guest can engage the manual switch to release the latch and subsequently lift the sewer inlet cover so that they may hookup their gray or black water hoses and dump sewage.

Although water and electric supply are simply turned off until instructions are provided to the hookup pedestal to turn on the same, the sewer inlet could be passively used by unverified guests. Accordingly, a particular aspect of the sewer inlet cover includes an innovative lockdown feature that limits the access to the dump station inlet and only allows for the release of the inlet cover when the smart switch for the electric power service is activated. Generally, when the control system provides power to the hookup pedestal, the electric circuit to the manually actuated switch is powered so the guest can operate the manually actuated switch to unlock the latch and open the inlet cover. When the inlet cover is opened, the waste hose from the RV is placed into the space between the inlet cover and the opening to the dump station inlet and can be connected to the inlet end of the sewer waste pipe. However, until the manually actuated switch is powered by the electric panel upon verification of the guest by the system, the manual switch is dead and will not unlock the latch.

The integrated and automated reservation and control system is another innovative aspect of the present invention which builds on the known automated reservation system by integrating it with the automated control system that uses reservation information along with the sensor information at the parking facility and the controllers for the smart switches and smart valve to automatically control the utility services at the parking sites without necessitating intervention by any staff that can be onsite or offsite. The automated system allows for manual override of the utility services and other interventions by the staff as situations can arise that are more suited to human interaction, communication, and control.

In yet another aspect of the present invention, the business method of the present invention maximizes the use of the lot for the RV parking sites and hookup services, minimizes the use of the lot for communal services, and eliminates any need for an onsite manager or other staff.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

FIGS. 2B and 2C are schematic representations of the multiservice hookup pedestal shown in FIG. 2A in an inactive state and in an active state, respectively.

FIGS. 3A and 3B are detail views of the sewer cover device for the multiservice hookup pedestal shown in FIG. 2A in a closed position and in an open position.

FIG. 3C is a perspective view of the sewer cover device with detail views of the mounting bracket and the sliding post.

FIGS. 4A and 4B are simplified schematic representations of alternative embodiments of the multiservice hookup pedestal according to the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
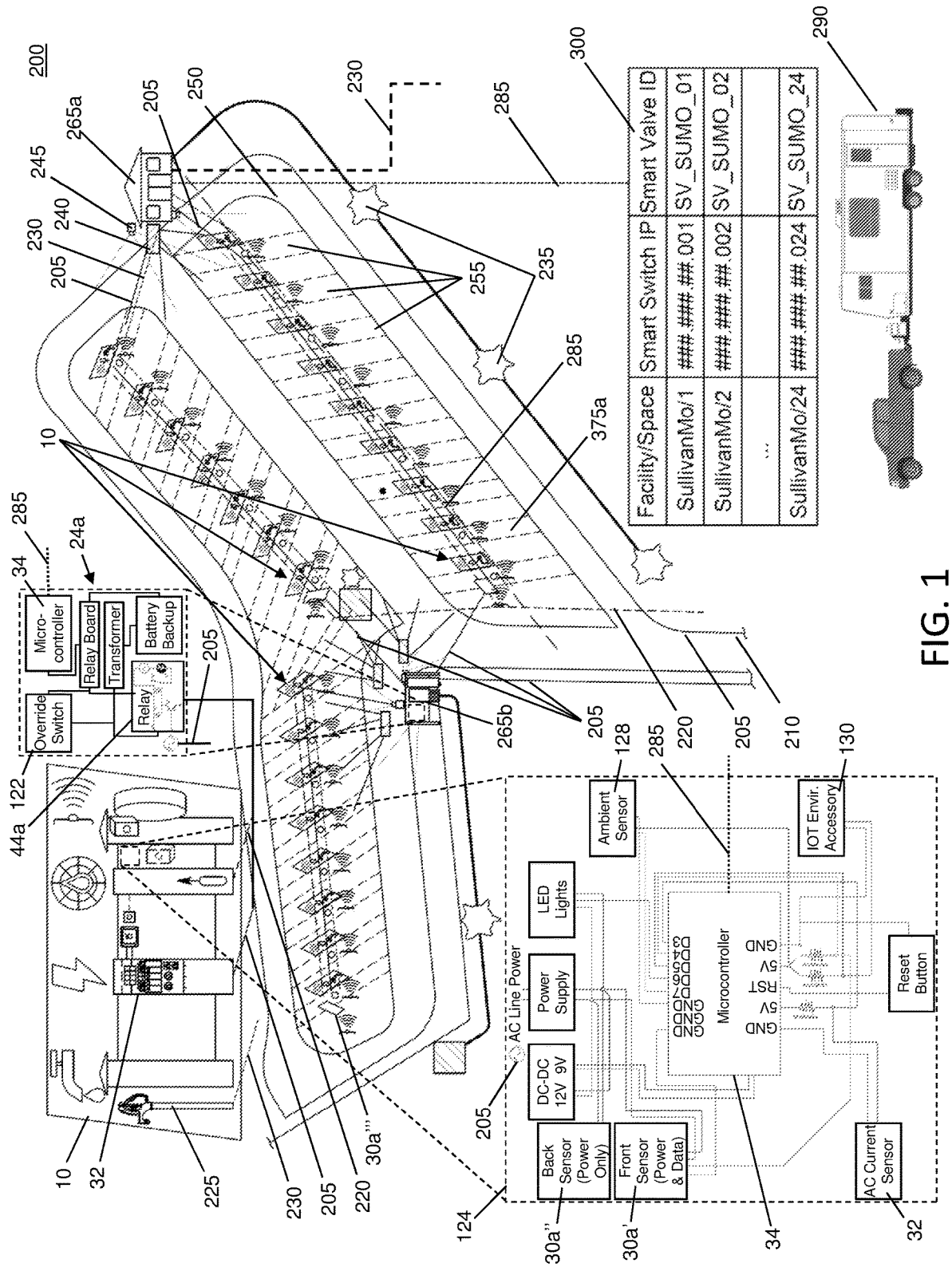
FIG. 1 is a schematic representation of an RV parking facility with infrastructure distribution systems for multiple services and multiservice hookup pedestals of the present invention.

The automated and remote control system for multiservice hookup pedestals allows for remote management of the reservations and hookup utility services at multiple recreational vehicle (RV) parking facilities 200 throughout the United States and Canada. The physical integration of the multiservice hookup pedestals into the RV parking facility's infrastructure is shown in FIG. 1 as a part of a site map. Particular features and functions of the multiservice hookup pedestals are described in detail below with reference to FIGS. 2-4, and FIGS. 5A and 5B illustrate the integration of the multiservice hookup pedestals into an automated parking site reservation system and an automated control system for the activation and deactivation of the utility services that are provided through the corresponding multiservice hookup pedestals.

As will be evident from the description of the different embodiments of the hookup pedestals below, the improved structural features and automation elements in the multiservice hookup pedestals allow for the integration of automated activation and deactivation of the utility services that are available through the hookup pedestals and also allow for one or more remote attendants with administrative control privileges to override the automated controls for the hookup pedestals. It will be appreciated that the improved multiservice hookup pedestals can also be used in traditional RV parking facilities in which an attendant activates and deactivates hookup pedestals, such as by flipping physical switches on a control panel or virtual switches in a control software program which correspond to the respective hookup pedestals to provide the utility services.

The automated reservation software system used for multiple RV parking facilities in the present invention is similar to currently known automated reservation systems for parking facilities. Additionally, the functionality of RV parking facilities' physical infrastructure is similar to currently known ground-level RV parking facilities, although as discussed below, some features are modified to maximize the parking spaces for the size of the overall facility. For the reservation system, a computer software program automatically makes parking site reservations for guests according to the availability of parking sites at the RV parking facilities, provides rental agreements with the guests for the duration of their stays (number of hours, days, or weeks), and processes the rental payments for guests. The return receipt for each reservation preferably includes customized instructions for the individual guest for their specific stay, particularly including the parking site that will have the hookup services activated for their stay and may also include a unique code that the guest can send back to the control system as a positive identification upon arrival at the parking site.

The unique features of the present invention allow the integration and use of the information from the automated reservation system with information from sensors and/or user inputs in an automated control system that activates and deactivates the utility services provided through the multiservice hookup pedestals using smart switches and smart valves along with manually actuated switches and manually actuated valves that are in series with the corresponding smart switches and smart valves, respectively. As used throughout this description of the invention, smart switches generally refer to electronically controllable switches and smart valves refer to an electrically actuated valve that is controlled by a smart switch. Accordingly, as described in detail below, the innovations for the present invention are primarily in the features and functionality of the multiservice hookup pedestal and in the components and operation of the control system. The control system includes one or more programmable logic controllers (PLCs) to process the reservation system information and the sensor information and determine whether or not an active status signal should be communicated to a particular multiservice hookup pedestal. When the PLC communicates the active status signal to the multiservice hookup pedestal receives, the smart switch and the smart valve are activated.

RV Parking Facility Infrastructure

As shown in FIG. 1, the RV parking facility's physical infrastructure 200 includes electrical lines 205, potable water mains 230, sewer waste pipes 220, lighting towers 235, wireless communication stations 240, video cameras 245 as well as the roads 250, the RV parking spaces 255, and the data communication access 285 to the internet or any other networked communication system which, as described below, can be through a wired connection or wireless communication. Each RV parking site has the parking space for the recreational vehicle (RV) 290 along with an adjacent multiservice hookup pedestal; preferably, the hookup pedestals are positioned in service islands 260 that are slightly elevated from the surface of their corresponding parking spaces. The multiservice hookup pedestals each connect to the utility services that are provided to each one of the RV parking sites, namely, at least one electrical line transmissively connected to the electric power grid 210, a dump station inlet 215 fluidly connected to the sewer pipe, and a plumbing fixture 225 fluidly connected the potable water mains. The electric power lines are preferably contained in underground conduits as are the communication/control wires, preferably in separate underground conduits, that are connected to the sensors that are connected to or proximate to the hookup pedestals. The lines, wires, mains, pipes, and conduits for the utility services extend below and between the hookup pedestals and preferably extend to a control building 265a or an equivalent housing for the control equipment, such as a potable water distribution and control cabinet, and the electric power and communication/control conduits may similarly extend to an electric power distribution control box 265b that can be separate from the control housing. The control building preferably contains one or more programmable logic controllers (PLCs) 300 that are a part of the control system for the smart valves, and the electric power distribution control box may also have PLCs for the smart switches. As explained below, the PLCs, smart switches, and smart valves could also be integrated into the multiservice hookup pedestals. The RV parking facility also preferably includes backlit instructional signage that can be used to provide instructions to guests, visitors, service providers, and others.

According to the different configurations of the hookup pedestals described in detail below, the smart switches and smart valves could be centrally located as a group at the parking facility proximate to the hookup pedestals but not within the hookup pedestal housings, such as in the control building, a control cabinet, or any other control housing. Alternatively, the smart switches and smart valves may be distributed to each of the hookup pedestals so they are located within the housings of the corresponding hookup pedestals. Each one of the smart switches and smart valves preferably has its own unique internet protocol (IP) address or other unique identifier. Accordingly, for those RV parking facilities which use hookup pedestals that each contain the smart switches and smart valves within their respective housings, the PLCs could be remotely located from the parking facilities so the computer control for multiple RV parking facilities could be centralized, and there may not be a need for a separate control building or electric power distribution control box at the individual parking facilities. It will also be appreciated that the sensors, smart switches, and smart valves could communicate data wirelessly so instead of using communication/control wires extending to each one of the hookup pedestals to communicate with the PLC, these electronic devices would communicate through the wireless communication access points.

Although there may be some space in the parking facility that is used for communal services, such as a trash bin, a dog park, and possibly some vending machines, the area of the parking facility is preferably maximized for the space available to the RV parking sites. Accordingly, there is preferably no pool or shower house that could be shut down during a pandemic nor is there any store or clubhouse that would require an attendant or other onsite staff. To help maximize the use of the space for the RV parking sites, the parking sites are pull through from wide side roads with easy angles and nearly-level parking sites so there is no backing necessary anywhere in the parking facility. Additionally, the parking sites are preferably arranged in rows of parallel parking spaces with the corresponding adjacent multiservice hookup pedestals. The business model of the RV Self-Park® parking facilities is not a traditional campground type of facility in which the green spaces between parking sites are larger than the parking spaces. In comparison, the RV Self-Park® parking facilities would have small green spaces between the parking sites for the hookup pedestals, but the green spaces between adjacent parallel parking spaces would be narrower than the width of the parking spaces, and there may not be enough space for trees or campfires.

Additional infrastructure features of the RV parking facility also support the management, control, and safety of the guests, their vehicles, and the RV parking facility equipment and property. For example, video cameras are strategically positioned as are the WiFi access points for real-time monitoring and wireless communications throughout the parking facility. The camera wiring conduits extend around the periphery of the parking facility, and street lights are anchored with concrete bases. Video feeds from the cameras can be transmitted over a computer network to an offsite attendant for remote monitoring of the RV parking facility and can also be streamed online to the guests of the parking facility which also allows for private viewing of the images while guests remain within their parked vehicles or elsewhere where the guests have internet access and an active reservation which provides them with the access rights to the video stream. The video feed can also be shown on monitors behind the windows of the control building or other control housing. The control building is securely locked to protect PLCs when they are located at each of the parking facilities as well as the smart switches and the smart valves when they are centrally grouped and other equipment for the facility that may be stored in the building. The control building could be a small shack that also includes an alarm system that would provide a notification to the offsite attendant when there has been unauthorized access to the building or some other violation has occurred; additionally, the RV parking facility may have one or more strobe warning lights that can flash if there has been a violation. When the electric power distribution control box is separate from the control building, the alarm system may also detect whether there has been any forced entry or other tampering issue with the security of the box; similarly, alarms could also be integrated into the hookup pedestals.

The communication system used for the data communication access 285 to the internet or other networked communication system can be a wired system, a wireless system, or could have both types of systems for redundancy in operations. Generally, the communication system is preferably selected for each RV parking facility based on the type of service that is available at the local region and is cost effective. Representative examples of wired systems would include a T1 fiber optic line, a coaxial cable, or a twisted-pair public switched telephone network (PSTN), and representative examples of wireless systems include standard cellular service, high-speed 5G cellular service, and satellite service. With numerous options for the communications system, it will be appreciated that any current communication system between computer systems and their respective communications devices can be used with the present invention. As new communications systems are developed and become available, it is anticipated that they will have improved reliability and faster speeds and may even result in lower costs of operation.

Multiservice Hookup Pedestal

Each multiservice hookup pedestal 10 has a base 12, a housing 14 that is connected to the base, and a mounting bracket 16 that can be connected to the base and/or the housing depending on the particular configuration of the hookup pedestal. The housing contains at least an electric outlet panel 18 that has one or more electrical outlets for the electric power service. An inlet cover 20 to the dump station inlet is connected to the mounting bracket, and a latch 22 to the inlet cover provides for controlled access to the sewer service. The inlet cover moves between a closed position 36a and an opened position 36b, blocking the dump station inlet in the closed position and spaced a distance (D) from the dump station inlet in the opened position. The latch has a locked configuration 42a that prevents the inlet cover from moving from the closed position to the opened position and an unlocked configuration 42b allows the inlet cover to move from the closed position to the opened position. The latch's configuration between the locked and unlocked configurations is preferably operated by an electrically powered latch actuator 46. The multiservice hookup pedestal also has a hydrant 120a with a spigot or faucet 120b and a manually actuated valve 120c that is connected to the potable water service through a water line.

Figure 2A:
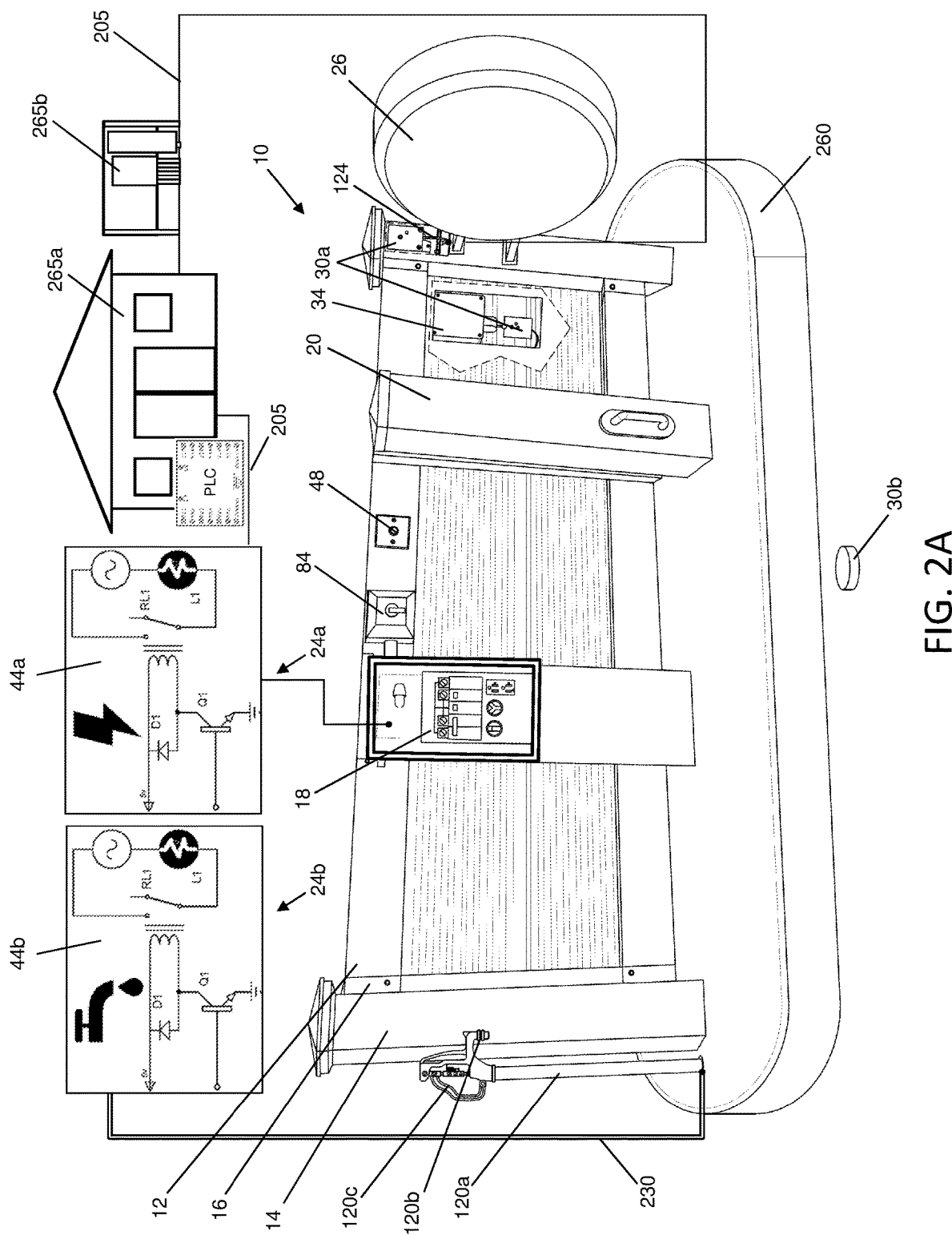
FIG. 2A is a perspective view of a first embodiment of the multiservice hookup pedestals according to the present invention.
Figure 5A:
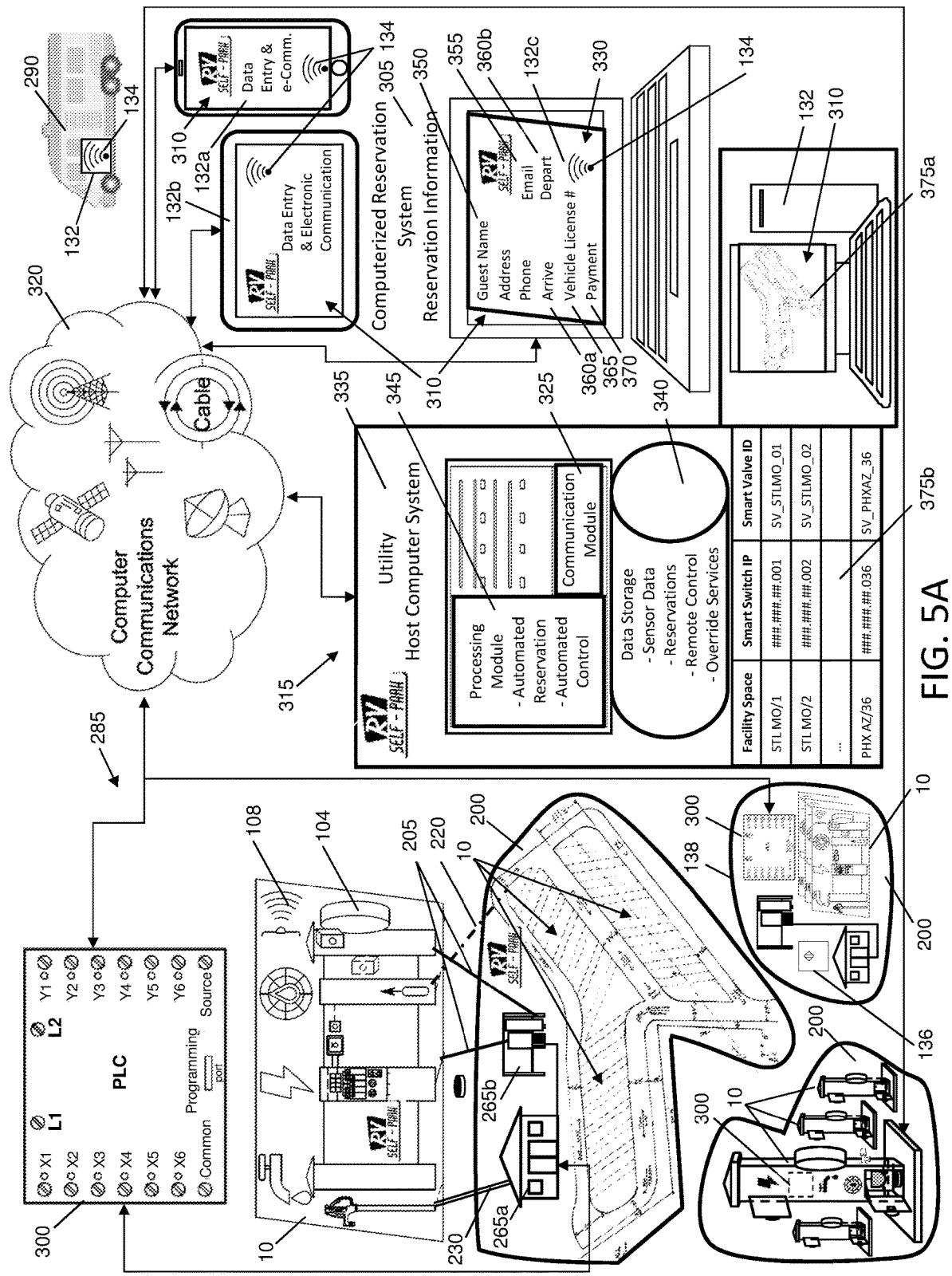
FIG. 5A is a diagram of the integrated automated reservation and control systems communicating with guests and multiservice hookup pedestals at RV parking facilities.

As generally shown in FIG. 2A and particularly shown in FIGS. 2B and 2C, the multiservice hookup pedestal has multiple electric power circuits. The electric circuit 124 for the sensors that are used to determine the presence of a vehicle in the parking space is always powered, whereas the electric circuit 24a between the smart switch and the electric outlet panel (i.e., the electric service smart switch) is only powered when the PLC communicates the active status signal to the hookup pedestal's electric service smart switch. The latch actuator and the manually actuated switch 48 are also on the electric circuit with the electric outlet panel that is controlled by the electric service smart switch. Accordingly, the electric service smart switch 44a is in series on the electric circuit with the electrical power line on one side of the circuit and the electric outlet, the manually actuated switch, and the latch actuator on the other side of the circuit. As generally indicated above, the microcontrollers and relays for the electric service smart switches could be physically located in the electric power distribution control box 265b (see FIG. 1) or could be located within the control building 265a (see FIGS. 2A and 4A)_or in the respective hookup pedestals 10 (see FIGS. 2B, 2C, and 4B). As schematically shown in FIG. 5A, in a network of multiple parking facilities, the integration of the hookup pedestals within the physical infrastructure can be any one of these options.

As shown in FIG. 2B, the smart switch is in its open state 50b which prevents any electric transmission from the electric line to the electric outlet panel, the manually actuated switch, and the latch actuator. The electric service smart switch is shown in its closed state 50a in FIG. 2C when the PLC provides the active status signal; in its closed state, the smart switch provides an electric transmission 52 from the electric line to the electric outlet panel and the manually actuated switch. The manually actuated switch is situated in series between the smart switch and the latch actuator, having an off-position 54b that keeps the circuit to the latch actuator open and prevents it from being powered by the electric transmission and having an on-position 54a that closes the circuit and provides the electric transmission to power the latch actuator. The latch actuator is operatively connected to the latch so that when the latch actuator is in its powered condition 56, it forces the latch to move between the locked configuration and the unlocked configuration.

As with other hookup pedestals, the electric power circuit includes a circuit breaker 90 and preferably includes multiple electrical outlets 88 and a rotary changeover switch 84 as an electric service selector 82. In particular, the electric service selector allows the guest to choose between 30/20 Amp electric power and 50 Amp electric power according to the corresponding knob positions 86 and the respective sets of electrical outlets. However, unlike other hookup pedestals, the electric power circuit also controls the electronically actuated latch that holds the inlet cover over the dump station inlet as described above. It will be appreciated that the use of the smart switch in combination with the manually actuated switch to selectively power the electronically actuated latch for the inlet cover could be incorporated into existing hookup pedestals as an improvement. For example, the hinged inlet cover disclosed in the '358 Patent could be modified according to aspects of the present invention to use the manually actuated switch and could be incorporated into the hookup pedestal disclosed in the '212 Published Application. It will also be appreciated that there could be other inlet covers, latch mechanisms, and release switches that would provide the sewer lockdown feature of the present invention. For example, as shown in the alternative view of FIG. 4A, a hinged inlet cover may rotate between the lowered position and the raised position such as disclosed in the '358 Patent and could have a latch that rotates toward and away from the inlet cover or could have a latch that extends and retracts like a deadbolt. In another alternative hookup pedestal configuration, an access door 38b on a hinge 62b could serve as the inlet cover, such as shown in FIG. 4B. Accordingly, different types of electrically actuated latches could be used with various types of inlet covers.

The smart switches are preferably operated by multi-channel relay controllers for single pole double throw (SPDT) solid state switches and preferably use a standard communication protocol, such as I2C serial communication. The preferred operation of the smart switches allows for chaining together relay controllers as well as sensors and other electrical equipment, such as pulse width modulated (PWM) drivers. The relays are biased-open 58 in their nonconducting open state when the PLC does not provide the electrical relay signal 60 corresponding with the active status of the smart switch. As explained above, the smart switches can be located in the control building or electric power distribution control box at the parking facility proximate to the hookup pedestals or within the housing of the hookup pedestal. In those embodiments in which the smart switches and smart valves are physically separated from each other and centrally located in the control building and the distribution control box, respectively, the control system preferably has one PLC that is located and in operative communication with the smart switches and another PLC that is located and in operative communication with the smart valves. For those embodiments in which the smart switches and smart valves are collocated with each other within the hookup pedestals, a single PLC could be used within each hookup pedestal or multiple PLCs could still be used.

The latch is preferably biased by a spring 126 to its locked configuration with the moving portion of the latch is forced outwards relative to the housing. The latch actuator is preferably a solenoid that is positioned within the housing and forces the latch to its unlocked configuration when the solenoid is powered. In operation, when the PLC provides the active status signal, the smart switch allows the transmission of the electrical power to the manually actuated switch which is preferably biased open to the off-position, such as with a spring-loaded pushbutton switch 92. Since the pushbutton switch is biased open 58, the latch actuator remains unpowered until the pushbutton switch is depressed to the on-position to close the circuit and power the solenoid. When the latch is unlocked, the inlet cover can be moved to its open position. The pushbutton switch preferably has a light that is lit when the electric service smart switch is in its closed state so that there is a visual indicator to the guest that the electrical power has reached the pushbutton switch even when it is in the off-position, and the latch to the inlet cover can be unlocked by depressing the pushbutton switch to its on-position. Additionally, it will also be understood that a spring-loaded toggle switch or any other biased-open manually actuated switch could be used in place of the pushbutton switch to release the latch.

Another smart switch 44b in communication with the corresponding PLC is used to control the electrically actuated valve to create a smart valve 28. The smart switch is situated in series between the electrical power line and the electrically actuated valve. When PLC sends the active status signal to the smart switch, the smart switch is closed so that power is provided to the electrically actuated valve which moves the valve to an open flow state 94a. The electrically actuated valve is connected to and in fluid communication with the potable water service (i.e., water main) through the plumbing fixture 120. As with the electric service smart switch, the potable water smart switch can be located within the hookup pedestal's housing or can be within the control building at the parking facility proximate to the multiservice hookup pedestals. Accordingly, the smart valve can be located in the control building at the beginning or in the hookup pedestal's housing at the end of the water line running from the control housing to the corresponding hookup pedestal. Regardless of the location of the smart valve, the hookup pedestal has a water line within its housing that connects to the manually actuated valve so the manually actuated valve is fluidly connected to the smart valve. When the electrically actuated valve is in its closed flow state 94b, there is no water flow to the manually actuated valve, and when the electrically actuated valve is in the open flow state, the manually actuated valve has a range of flow rates between a no-flow rate and a full-flow rate, inclusive.

Rather than opening or closing a smart valve with a single solenoid, the smart valve preferably uses an electric motor which actuates the valve mechanism to be either in the open state or a closed state. An example of a smart valve with an electric motor is described in U.S. Pat. No. 9,057,453 which is incorporated by reference. Once the valve has been placed into its desired state, electrical power is no longer needed to the electric motor. In comparison, in a valve that is biased closed or biased open and uses, the single solenoid would have to be continually powered to change the state of the valve from its biased state of operation. It will be appreciated that a valve mechanism that is neither biased open nor biased closed could be actuated open by one solenoid and actuated closed by another solenoid so that the solenoids only need to be powered when changing the state of the valve, similar to the electric motor. Accordingly, the second smart switch in the second electric power circuit 24b powers the electrically actuated valve to a closed flow state when the programmable logic controller (PLC) either provides an inactive status signal 100a or does not provide an active status signal 100b. As in the '453 Patent, the PLC may send an open-valve signal or a close-valve signal to place the smart valve in either a flow configuration or a shut configuration, either allowing water to flow from the water main to the manually actuated valve at the respective water spigot in the activated hookup pedestal or preventing the flow. It will be appreciated that just as the smart valve can use an electric motor drive to actuate the valve mechanism, an electric motor can be used to open the inlet cover (not shown), and in such a case, it would be preferred for the manually actuated switch to either release the inlet cover so it rests on the elbow end of the waste hose to hold the hose in place while it is connected to the dump station inlet or reverse the motor and close inlet cover to prevent the escape of odiferous and noxious fumes when the waste hose is removed from the dump station inlet.

The vehicle sensor 30 and a micro-processor 34 communicate data with the PLC and are connected to at least one of the base, the housing, and the bracket. As explained above, the vehicle sensor and the micro-processor are electrically connected to the electrical power line in a separate electrical circuit without regard to any status signal provided by the PLC to the smart switch for the electric service provided through the multiservice hookup pedestal. The vehicle sensor determines a vacant status 96*a* or an occupied status 96*b* as the parking site occupancy status in the parking space proximate to the vehicle sensor, and the vehicle sensor communicates the parking site occupancy status data to the PLC. The multiservice hookup pedestal may use different types of vehicle sensors, such as a pair of through-beam sensors, an in-ground sensor, a machine vision sensor, and/or an infrared reflective sensor.

As particularly shown in FIGS. 2A-2C, a pair of through-beam sensors 30*a* are combined with an in-ground sensor 30*b*. The in-ground sensor is preferably a magnetic sensor operating in association with vehicle detection algorithms as is generally known for parking facilities. The through-beam sensors operate in pairs with one of the sensors 30*a'* being attached to the front side of the hookup pedestal and facing forward towards the parking space corresponding with the hookup pedestal on which the through-beam sensor is mounted while the other through-beam sensor 30*a"* is attached to the back side of the hookup pedestal and facing backward towards the hookup pedestal in the adjacent parking site. For the parking site at the end of the row where there is no parking site adjacent to the backside of the hookup pedestal, a separate post 30*a'''* on the opposite side of the parking space holds the through-beam sensor that would have been on the back of the hookup pedestal on the adjacent parking site. Accordingly, it will be appreciated that the sensors for the parking space do not necessarily need to be attached to the hookup pedestal to which the sensor is associated for the determination of the parking site occupancy status.

Each one of the multiservice hookup pedestals is also equipped with a line-load sensor 32 that monitors either the level of electrical power usage through the electrical panel at the corresponding RV parking site or whether there is any electrical power usage through the electrical panel. Traditionally, hookup pedestals for electrical power service use line-load sensors and/or an energy meter when a user prepays for a particular amount of energy, such as in the '755 Patent, so the amount of energy supplied through the hookup pedestal is limited according to the amount that has been purchased. As explained below with regard to the automatic control system of the present invention, the line-load sensor of the present invention is used in a different way. According to the present invention, the level of electrical power usage according to the line-load sensor is evaluated along with the remaining time in a reservation window and the parking site occupancy status to determine the availability of the parking site for the automated reservation system.

The multiservice hookup pedestal can also include a parking site status sign 26 which communicates with the micro-processor and/or the PLC to provide different visual indicators 104 depending on whether the parking site is vacant or has either an authorized occupant 104*b* or an unauthorized occupant 104*a*. For example, the micro-processor or PLC may determine an unauthorized vehicle condition for the parking site when the parking site occupancy status is determined to be occupied, but the PLC has not provided the active status signal for an active reservation. When the parking site is vacant, the parking site status sign may be unlit or lit with a white light, and the parking site status sign can be lit with a green light for the authorized occupant, a yellow light when a rental is pending with an arrival expected within a set period of time, such as within several hours of the start time of a reservation period, and a flashing red light for the unauthorized occupant. Since the parking site status sign functions even when the PLC has not provided the active status signal, it is evident that the parking site status sign is electrically connected to the electrical power line on the same electrical circuit as the sensors, i.e., without regard to any status signal provided by the PLC. It will also be appreciated that there could be a display screen 102 on the multiservice hookup pedestal which provides messages depending on the occupancy determination for the parking site. In combination with the visual indication provided by the parking site status sign, a speaker 106 could provide an audible warning of the unauthorized vehicle condition. It will be appreciated that the parking site status sign and speaker are examples of a site status indicator which are generally within a line of sight and/or audible distance to the multiservice hookup pedestal. A display screen in the multiservice hookup pedestal is another example of the site status indicator.

The multiservice hookup pedestal may also include a user interface device 108, such as a keypad entry 108*a*, a credit card reader 108*b*, a touchscreen display 108*c*, and/or a wireless communication module 108*d* that can be used to positively confirm an arrival of an authorized guest and may also be used when the guest has completed the stay and is departing. The user interface device is electrically connected to the electrical power line on the same electrical circuit as the sensors, i.e., without regard to any status signal provided by the PLC, and when the positive user identification is input into the user interface device, the user input devices communicates the information to the PLC. An alternative approach would provide a single user interface device for the parking facility, such as in a kiosk at the entrance which may or may not have a gate, but a more automated and entirely wireless system would avoid any user interface device in the hookup pedestals or in a kiosk so that guests are not inconvenienced by having to exit their vehicles to enter a code in a physical keypad. Accordingly, it will also be appreciated that as a form of positive identification, upon arrival at the parking facility or parking site, the guest can send the unique code electronically through various communications mechanisms, such as a mobile app, the reservation system website, a phone call from an interactive voice/DTMF response system, a text message, or any other means for transmitting an electronic communication. Further, as explained below, the system can incorporate automated electronic communications so the guests would not have to take any action to provide the code, such as would be the case when the guests' smartphones have a proximity beacon 134 that is wirelessly paired with the control system of the parking facility that has a proximity sensor 136.

The multiservice hookup pedestals shown in FIGS. 2 and 4A has the water hydrant and the inlet cover on opposite sides of the housing for the electrical outlet housing. In the multiservice hookup pedestal shown in FIG. 2, the water hydrant is spaced from the inlet cover by a distance that is greater than the height of the electrical outlet housing. This embodiment of the hookup pedestal has posts on opposite ends with a half-wall panel connected to the posts and between the posts. The span of the half-wall panel is more than twice the height of the posts. Preferably, the posts are made from a vinyl plastic material that is preferably reinforced with metal. It will be appreciated that the posts may be made out of other materials, including other elastomeric materials, composite materials, and/or metals, such as aluminum. Similarly, the half-wall panel, housing, brackets, and other structural elements can be made from sturdy, weather-resistant materials.

As explained above, the multiservice hookup pedestals have an innovative lockdown feature for the inlet cover that limits the access to the dump station inlet that only allows for the release of the inlet cover when the smart switch for the electric power service is activated. Generally, when the control system provides power to the hookup pedestal, the electric circuit to the manually actuated switch is powered so the guest can operate the manually actuated switch to unlock the latch and open the inlet cover. When the inlet cover is opened, the waste hose 270 from the RV is placed into the space between the inlet cover and the opening to the dump station inlet and can be connected to the inlet end of the sewer waste pipe. The inlet cover can be lowered onto the elbow end of the waste hose to hold it in place. Preferably, when the spring-loaded switch is released, it moves back to the off-position and electric power is immediately cut to the latch actuator so the latch is biased back into its locking configuration. Accordingly, in the preferred embodiment, the cover should be raised while the power is on and the latch is released so the locking mechanism in the cover is raised past the latch, and the waste hose elbow is placed over the dump station inlet under the cover, preventing the inlet cover from lowering back onto the dump station inlet with the latch again locking. It will also be appreciated that the spring-loaded switch may also be connected to a relay with a timer which closes the circuit to the actuator for a set period of time as in the '358 Patent. When the waste hose is removed from the space between the cover and the opening to the dump station inlet, the cover is lowered back down to onto the inlet and the latch again locks the cover in its closed position. According to the features of the present invention, at any time during the reservation window when the smart switch is activated, the manually actuated switch can be moved to the on-position to activate the latch actuator and release the inlet cover.

According to the particular embodiment of the hookup pedestal shown in FIGS. 3A-3C, the inlet cover is a post 38a that slides on the mounting bracket between the lowered position 36a and the raised position 36b. The post is larger in size than the dump station inlet so the bottom end of the post surrounds the dump station inlet when the post is in the lowered position. The mounting bracket is a track 62a that is attached to a panel section 72 that is fastened to the half-wall panel between the end posts. The inlet cover post has a runner 66 that slides relative to the track, a handle 40 connected to an exterior side 68 of the post, and a plug 64 held within an interior space 70a in a bottom section 70b of the post. The plug can be attached by fasteners in the bottom section or it can be hung by chains from an upper section of the post. Regardless of how the plug is attached to the post, it is situated in the dump station inlet when the post is lowered into the closed position and is spaced from the dump station inlet when the post is raised into the opened position. The panel section preferably has an open slot 74 to its interior space 76. The housing for the latch and latch actuator is fastened to the panel section within the interior space, and the post has a bar 78 extending from its outer surface 80 through the slot into the interior space of the panel. As shown in FIG. 3A, the bar is held below the latch when the post is lowered to the closed position with the latch in the locked configuration. As shown in FIG. 3B, the bar is permitted to slide above the latch when the latch is in the unlocked configuration, allowing the post to be raised into the opened position.

More compact configurations of the multiservice hookup pedestal 10 are shown in FIGS. 4A and 4B. Although these compact configurations are shown in a tower arrangement 275, with the height of the hookup pedestal being greater than the width of the hookup pedestal and the base of the hookup pedestals securely fastened to a concrete pad 280, it will be appreciated that the structural arrangement of the equipment and the spacing between the water spigot and dump station inlet as well as their spacing from the electrical panel can vary. According to the preferred embodiment of the latch actuator described above, the manually actuated switch is positioned within reach of the inlet cover's handle. Of course, if the latch actuator is a motor as suggested above, the manually actuated switch can be located beyond the reach of the inlet cover's handle. As shown in FIG. 4A, different types of inlet covers can be used with the hookup pedestal according to the innovative aspects of the invention as described above. In particular, the sliding post described above and the hinged inlet cover disclosed in the '358 Patent are different types of inlet covers that can be integrated into the multiservice hookup pedestal. As illustrated in FIG. 4A, the smart switches and smart valves for the entire set of multiservice hookup pedestals at the parking facility can be physically located together 118a in the control building as described above. Alternatively, as shown in FIG. 4B and also described above, the multiservice hookup pedestals can contain their respective smart switches and/or smart valves within their corresponding housings 118b.

In those multiservice hookup pedestals which contain the relay controller for the smart switch and the smart valve within the hookup pedestal's housing along with the electrically actuated valve, the weather-resistant housing is important to protect the electronic components against the elements. It will also be appreciated that in some environments, the extremes in the outside ambient temperature could be outside the operational temperature ranges for some of these electronic components, particularly including the relay controllers and/or electrically actuated valves. Accordingly, these fully integrated multiservice hookup pedestals may also have environmental control elements that would be found in the control building that house the groups of smart switches and smart valves and the PLC for the multiservice hookup pedestals, such as temperature sensors, heaters, and fans. These accessories and corresponding control systems are described in more detail below. It is possible that for some RV parking facilities, the centralized grouping of the smart switches and smart valves with the PLC in the control building could be a more efficient way to incorporate the smart switches and smart valves into the multiservice hookup pedestals.

The centralized grouping can be beneficial in retrofitting the multiservice hookup pedestals in existing RV parking facilities with smart switches and smart valves which would improve the automation of the hookup pedestals in the existing facilities. Retrofitting existing hookup pedestals for RV campgrounds and other RV parking facilities with the centralized grouping would improve the efficiency in controlling the hookup pedestals by an onsite attendant and would also allow the hookup pedestals to be controlled by an offsite attendant as in the preferred embodiments of the present invention. As indicated above, the attendants preferably have administrative control privileges which allow the attendants to work with the guests to modify their reservations and override the automated controls when necessary. Similarly, the centralized grouping can be beneficial when adding the multiservice hookup pedestals to existing parking facilities belonging to service providers of related services that are regularly used by the RV community and already have one or more onsite buildings, such as fuel services and/or maintenance services.

As another application of the multiservice hookup pedestals with the centralized grouping of smart switches and smart valves in the control building, there are many large ground-level parking lots for retail stores which are usually empty at night, and the addition of the multiservice hookup pedestals to a portion of these parking lots in combination with the automated reservation system and automated control could allow guests to schedule short-term, overnight stays when the parking lots are otherwise not being used. Accordingly, the integration of the automated reservation system with the automated control system as generally explained above and described in more detail below for the multiservice hookup pedestals would be an improvement over current systems that are not integrated and do not allow for the automated reservation of parking sites combined with the automated control of the corresponding hookup pedestals. Regardless of the particular type of smart switches, electronically controlled relays, and smart valves used for multiservice hookup pedestals for the parking facility, the computer control program can operate remotely from the parking facility on a centralized host computer system 335 and can send signals to the smart switches and the smart valves through at least one computer control unit or PLC 300 that is preferably housed in the control building or a control room of a building in an existing parking facility.

Pedestal Accessories—Sensors & Controllers

The multiservice hookup pedestal 10 may also include environmental sensors 128 which monitor ambient conditions of the pedestal and operational parameters of the pedestal and various accessories that can be incorporated into the pedestal to manage the environmental conditions. Through a communication module controlled by the local microcontroller 34 that communicates with the centralized host computer server that is used to monitor the operational conditions, one or more attendants can remotely monitor and control local systems, intervene when necessary, and save data in a historical database 340 within the central server. Information relayed from the local controller to the centralized server allows a user to remotely access unit information and receive alerts on potential system failures through a user portal accessed using a management dashboard. The central server includes a processing module 345 for receiving and processing unit information in addition to the database for storing the historical information. The database saves unit data that may include threshold operational parameters for unit accessories which can be correlated with real-time unit data received from the local microcontroller to detect system failures.

Accessories that can be monitored by ambient sensors and the control system include the dump station inlet operation, the electrical panel, and the water spigot. For example, a cold weather spigot assembly, a dump station inlet blockage alert system, an amperage meter, a data usage meter with flow capacity allocation as set forth in U.S. Pat. No. 7,113,990 which is incorporated by reference, and/or other accessories can be incorporated into the multiservice hookup pedestal. When a cold weather spigot is integrated into the multiservice system described, the ambient environmental sensor could be a temperature sensor that detects the temperature of the spigot assembly to alert users when it may be susceptible to freezing. Similarly, a fluid sensor could be monitored by the control system for a possible waste blockage within the dump station inlet and subsequently alert the attendant through the central server if a blockage is detected. Thus, the ambient environmental sensors could include but are not limited to temperature sensors for monitoring unit temperature as well as fluid sensors for detecting inlet blockage. Furthermore, power sensors could be used to monitor accessory power usage, such as current draw, to monitor whether the accessory is drawing power from the local controller and functioning properly.

It will be appreciated that with the growing numbers and types of environmental management systems that are joining the internet of things (IOT), smart environmental accessories 130 could also be incorporated into the multiservice hookup pedestals. The local controller could be a part of the smart accessories, and rather than having separate ambient environment sensors corresponding to the particular accessories, the smart accessory could self-monitor and relay operational data to the local controller to be communicated to the central server. Similarly, the smart accessories could work in combination with one another and the separate environmental sensors to provide redundant monitoring. For example, for a cold weather spigot assembly, the smart environmental assembly could be a heat tape with a thermostat that is set to turn on when the ambient temperature drops to a predefined minimum temperature ($T_{min}$) that could be several degrees above the freezing temperature of water. If the ambient sensor 128 measures a temperature that is at a threshold level ($T_{thresh}$) which is below the predefined minimum temperature ($T_{thresh} < T_{min}$), the control system can check the line-load sensor 32 for the heat tape, and if the line-load sensor indicates that there is no amperage draw, the central server can trigger a warning signal that the heat tape has failed or is malfunctioning.

Automated Systems—Reservations & Control of Services

The computer software program for reserving the RV parking sites that are located at various RV parking facilities is similar to the automated reservation process that have been used for existing RV parking facilities and hospitality and travel services, such as hotels, rental properties, and rental cars. As indicated in the Related Art section above, it has been known for decades that parking facilities could combine automated and remote monitoring with reservation systems and self-service-payment kiosks, and it has also been known for decades that self-service hookup pedestals can be located at the parking sites. However, these known systems require payment at a local kiosk or central transaction interface point in order to activate the utility services through the hookup pedestal, and there is no system which integrates the automated reservation and parking system functionality with an automated control system to activate and deactivate the services available through multiservice hookup pedestals at the parking sites based on the reservation information and sensor information for the parking sites.

As with current automated reservation systems, guests use the automated reservation system 305 to make their reservations at the RV parking facilities. They can use the reservation system to complete rental agreements for the duration of their stays (number of hours, days, or weeks) and process their rental payments. As generally shown in FIG. 5A, the computerized reservation system has an online reservation portal screen 310 which receives reservation information from the guests through the online reservation portal screen. The computerized reservation system allows guests to select parking sites and the type of parking site at the corresponding parking facilities according to the availability of parking sites that the reservation system automatically determines according to the information exchange with the respective guests. Some parking sites may have additional manufactured amenities to choose from such as patios, picnic tables, and/or shade/non-shaded options and other desirable natural amenities, such as scenic views and shore access parking sites. It will be appreciated that the pricing of the individual sites could be varied according to the amenity options.

As indicated above and explained in further detail below, the automated control system 315 is operatively integrated in a networked communication system 320 with, and uses the information from, the computerized reservation system, the PLC for the smart switches and the smart valves, as well as the sensors at the parking facilities. In cooperation with the PLCs at the respective RV parking facilities, the automated control system automatically and remotely controls the utility services that are provided through the multiservice hookup pedestals via communication with the PLC(s). In particular, the communication module for the reservation system 325 and the control system is preferably located remotely from the parking facility and the corresponding parking sites and communicates with the PLCs over a networked system of computers, such as the internet. The standard reservation information 330 provided by the guest includes the guest's name 350, the guest's contact information 355 such as a mailing address, phone number (preferably a smartphone or other cellphone), and/or email address, dates and times for the reservation period, including the planned start time of the reservation for the arrival 360a and the planned end time of the reservation for the departure 360b, vehicle information 365 such as the license plate identifier, and an electronic payment 370.

Figure 5B:
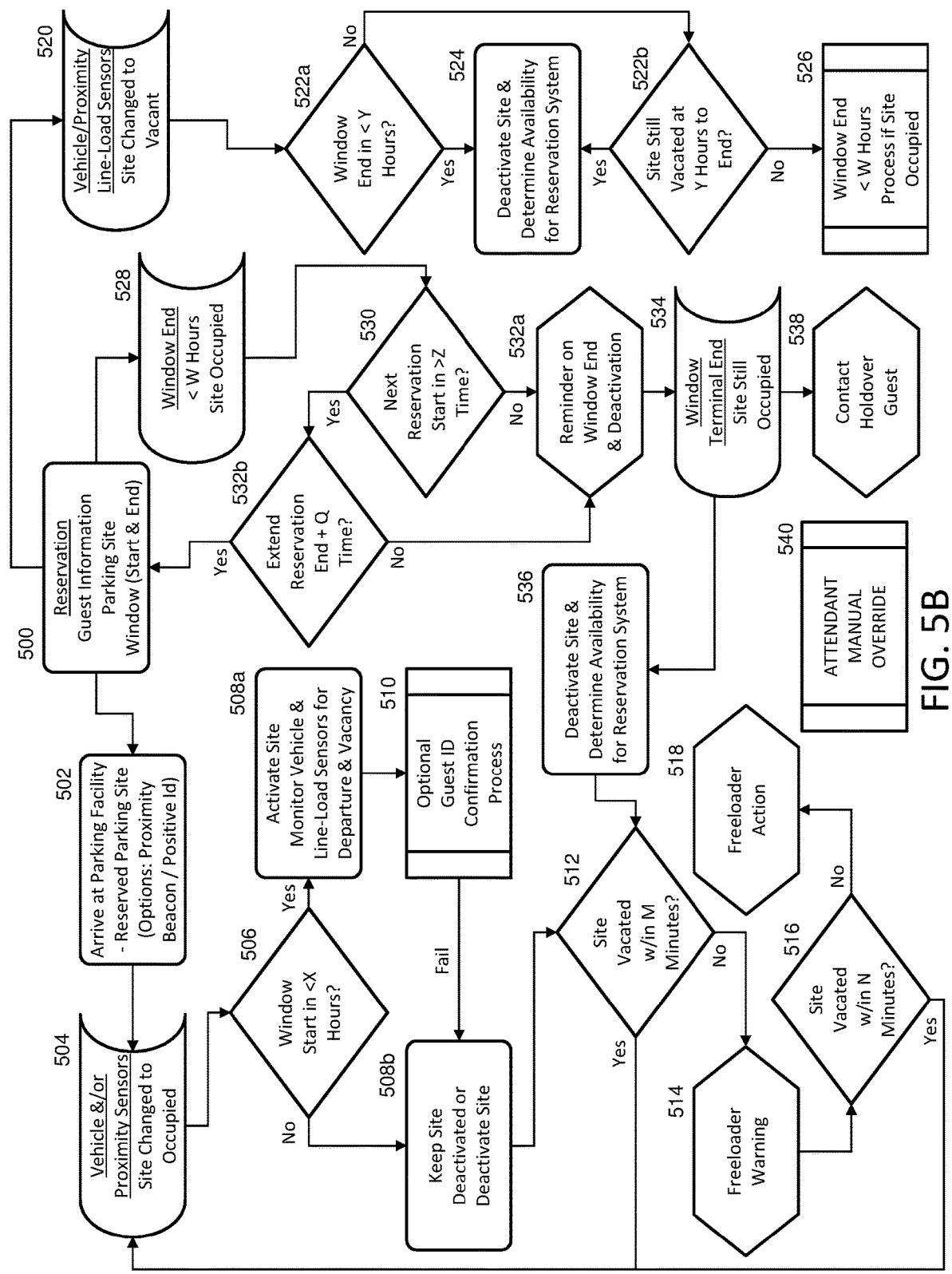
FIG. 5B is a flowchart of logic paths in the automated remote control system.

When a guest has made a reservation and arrives at their assigned parking site, the automated computerized control system follows a prescribed logic path, such as the steps shown in FIG. 5B, to confirm that the activation signal should be sent to the smart switch, electronically controlled relays, and smart valve for the hookup pedestal to activate the utility services. The attendant for the RV parking facilities is preferably located remotely from the facilities and has the authority to override the automated system for activating and deactivating the multiservice hookup pedestals in the parking sites, such as with the physical switches and/or virtual switches described above which could serve as manual override switches 122.

After having made a reservation through the reservation system 500, the guest receives a return receipt for the reservation which preferably confirms the reservation start time and reservation end time for the reservation, including the dates, and includes customized instructions for the stay, particularly including the space that will have the hookup services activated for the duration of their reservation, i.e., from the start time spanning to the end time of the reservation period or window. In addition to providing information that explains to the guest how to access the hookup services for their stay at the parking facility, the reservation return receipt preferably contains other information, including 1) a 24 hour emergency assistance number to call during any scenario of uncertainty where assistance becomes needed, 2) access to numerous security cameras located throughout the facility, and 3) one or more access codes to communal services available at the parking facility, such as an electric or mechanical locks for an onsite trash bin to dispose of trash or locks to the onsite dog park. The security cameras and emergency assistance number help the staff and guests resolve any scenario where assistance becomes needed and to provide peace of mind for visiting guests when walking about, tending to pets or sleeping in an otherwise new or strange, to them, environment. When necessary, staff has access to and can contact local service providers on behalf of guests, including RV repair facilities and equipment providers, private security businesses, tow truck operators, and first responders, such as ambulance services, fire departments, and police departments.

The staff and guests also have the option to have private video conferences regarding issues that may arise during their stay and may also conference in a service provider and/or a facility manager (remote or onsite) or owner of the particular parking facility when necessary. It will also be appreciated that the software for the automated reservation system, the automated control system, and the security/issues resolution communications can be integrated into a single software system that has front end functionalities for the guests (i.e., reservation, service, and/or security requests) as well as the backend system management control functionalities for the staff, such as management and control of reservations and hookup services, additional service and/or security requests, and guest communications. A management dashboard is preferably used to operate the backend system management control functionalities and can also be used to monitor the status of the multiservice hookup pedestals. The management dashboard can be accessed by multiple users who can have different levels of managerial authority rights in the software, such as staff of a call center (in-house or third party), individual parking facility managers, and parking facility owners.

Preferably, the management dashboard provides a data view of each site's occupancy and rental status is color coded for a quick analysis of the parking facility in a glance. The data view can be a graphic representation 375a of the parking facility or can be a tabular view 375b. For simplicity, the color coding in the dashboard matches the color coding of the lighted signs in each parking site: yellow indicates either a pending rental or the parking site is vacant and in a countdown process to be returned to the available inventory of open sites for a new reservation; red indicates various potential problems and may require action or monitoring until the issue clears; green indicates that the parking site is rented and all services are on and working; white indicates that the parking site is vacant and available for rental. Rental start times and end times and any issues are preferably shown in the boxes representing the corresponding sites to provide the remote attendant with an efficient overview of the parking facility at a glance, and examples of the space status information in tabular form are shown in FIGS. 2B and 2C.

When the guest arrives at their designated RV parking facility and pulls into their assigned and rented parking site 502, the automated control system receives the occupied status information 504 from one or more vehicle sensors that monitor the parking site occupancy status and also checks the reservation information from the reservation program to confirm that the reservation window has begun for the parking site 506. Some guests may arrive a little early so the control system allows for this situation by accepting early arrivals for a reasonable period of time that the parking facilities manager(s) can set in their backend data entry to the control system. A default for an acceptable early arrival can be approximately thirty (30) minutes to a couple of hours or some other number of minutes or hours (time to window start <X hours) depending on the length of the stay and the end time for the previous guest that has reserved the space for the time period before the arriving guest. As will be evident from the logic paths explained below, guests that have longer reservation windows may be afforded extra considerations at the start time and end time of their reservation windows.

When the reservation window is either already opened, waiting for the guest, or the guest arrives within the prescribed early arrival period, the control system communicates with the PLC to send the active status signal for activating the smart switches and smart valves, thereby activating the utility services 508a through the multiservice hookup pedestal as described in detail above. Throughout the reservation window, the vehicle sensors and the line-load sensors are automatically monitored by the control system to check for a departure of the recreational vehicle so the control system can determine whether there has been an early vacancy that allows the open time for the parking site to be placed back into the reservation system's inventory of open sites that are available for a new reservation. The automated control system preferably uses internet communications and internet protocol (IP) addresses to activate and deactivate smart electric breaker/switches or other electronically controlled relays to activate electric current flow to the correct pedestal for electric power and smart valves for water hydrants that are situated at hookup pedestals in service islands that are adjacent to and preferably elevated from the respective parking sites. As explained in detail above, the activation of the smart switches for electric power also allows the guest to unlock the latch to the inlet cover using the manually actuated switch. The automated control system preferably uses secure communications (closed) with the smart switches and smart valves to automatically turn on the electric power and the water, respectively, at the hookup pedestal in the assigned parking site.

Although the control system preferably immediately activates the utility services when the occupied status is triggered by a vehicle within the reservation window and early arrival period, the control system may also require the arriving party to provide some form of positive identification confirming that they are the guest 510. This can be performed any number of ways, including the entry of information through a keypad, a reader, a touchscreen display, and/or a wireless communication module. With regard to wireless communication, if the guest has already registered their mobile phone with the reservation system or the guest has previously been a guest with the RV parking facility, the proximity feature of the smartphone can communicate wirelessly with the hookup pedestal's wireless access point or wireless sensor to automatically confirm the arrival. Accordingly, it will be appreciated that any type of data from a sensor being communicated to and monitored by the control system can be used to determine that a vehicle has arrived or has departed, particularly including the smartphone option which can be performed at the hookup pedestal or at an entrance to those parking facilities that choose to have a main gate. Similarly, for the keypad, reader, and touchscreen display, the data can be entered into these input/output sensors with a kiosk at the entrance to the parking facility or with the particular multiservice hookup pedestal at the parking site. If the guest identification positive confirmation process is activated in the control system and a positive identification fails to be made within a reasonable period of time after the arriving vehicle triggered the activation of the utility services, the parking site's utility services are deactivated and the possible freeloader process begins.

If a vehicle arrives at the parking site before the early arrival period for the next reservation window or otherwise fails the positive identification confirmation logic path, the control system will not activate the utility services through the hookup pedestal 508b. The arriving vehicle could still be the guest in which case, the guest can either access the automated reservation system to adjust their reservation window to the earlier arrival time or contact the attendant to request assistance and a possible manual override 540. However, it is also possible that a vehicle arriving at the parking site which does not have an open reservation window could be a traveler who is trying to use the parking space without reserving the space or paying for the utility services available at the parking site (i.e., freeloaders). It is also possible that the vehicle is for a guest who has reserved another parking site and accidentally pulled into the wrong parking site. The control system preferably has a delay that waits for a short period of time, such as several minutes (M) that can be set in the backend data entry to the control system 512, and if the vehicle remains in the parking site, the control system automatically provides a warning to the potential freeloader 514 or the mistaken guest as well as the offsite attendant. As described above for the hookup pedestal, the warning could be a flashing light and/or an audible notice. If there is a screen on the hookup pedestal, the control system could also provide instructions or messages that warn of the consequences for unauthorized parking. If the vehicle remains in the parking site for another period of time (N) 516 that may also be set in the backend data entry to the control system, a local towing company may be called to move the vehicle 518 and/or demand a payment of a minimal parking fee and service fee to pay for the dispatch of the tow truck to the facility following protocols as stated on the parking facility's signage as well as in park rules and guest agreements (such as for unauthorized holdovers as discussed below).

As described above, the backend of the control system's software integrates with the PLCs that control the smart switches and smart valves in the respective hookup pedestals. The front end of the software program allows guests to reserve sites and pay for their stay via an app on their smartphone 132a or tablet computer 132b or through a web-based software program on either of these portable electronic devices or through a laptop 132c or any other computer or electronic computing and communication device 132. It is also possible to provide a kiosk for guests to reserve any available parking site upon arrival. The sensors in the parking sites provide data to the automated control system to indicate initial arrivals of guests that need to check in, guests that have already checked in and may have temporarily departed their respective parking sites and are returning, vacancies on departure, potential overstays, and attempted freeloaders. Each scenario can be dealt with automatically in the computer program with the control of the hookup pedestals. For example, as shown in FIG. 5A, when reserving parking sites, guests enter their vehicle license number and the onsite sensors and cameras can serve as license plate readers so the system can automatically identify the guests' vehicles who have reserved their parking sites. The system preferably keeps a file of license plates for guests' vehicles to help the staff that is monitoring multiple facilities.

When it comes time for the departure of the vehicle and/or the end of the reservation window, the control system's software follows additional logic paths to deactivate the hookup pedestals in the parking sites when they are no longer being used. The software, either in the control software or the reservation software, can add any substantial time period before the start of the next scheduled reservation window back to the automated reservation system's inventory of open parking sites according to the time that is available for one or more intervening reservations. Accordingly, the automated control system also communicates with the reservation system when the vehicle sensors provide the vacant status information. When a vacancy has been detected using the vehicle sensors, the control system may also check the line-load sensor information to determine whether there remains an amperage draw through the electrical control panel 520 and the period of time that there has not been any power usage through the multiservice hookup pedestal. For some hitched trailers, it is possible to detach the trailer from the truck for an excursion or to get provisions at a store, and although the location of the trailer may not register with the vehicle sensors due to its location in the parking site relative to the sensors, the amperage draw would be indicative of the trailer being in the parking site. Accordingly, the line-load sensors can be a redundancy to the vehicle sensors and may also be checked periodically relative to the vehicle sensors to evaluate the reliability of the vehicle sensors.

When the sensors indicate that the parking site is vacant, the control system checks the reservation information for the parking site to determine whether the reservation is toward the end of the window. Just as some guests may arrive before the reservation window, it is also possible that guests could depart hours before the reservation window is at its end, and in some cases, the early departure could be one or more days early. For reservations that have a multiday window, when the reservation is in the final half day (Y hours), such as within the final ten to twelve (10-12) hours of the reservation window, if there is a vacancy and no electricity is being used for a prescribed period of time, the control system will determine that the parking site is vacant 522a and deactivate the utility services provided through the hookup pedestal 524. For a reservation window that is less than one (1) day, an early departure determination could be made for departure that is less than the prescribed end departure period assigned to a multiday reservation window (time to window end <Y hours). For example, if the control system determines that there is a vacancy for a prescribed period of time within the last six (6) hours or other prescribed end departure period of the smaller reservation window, the control system will determine that the parking site is vacant and deactivate the utility services provided through the hookup pedestal. If the end of the reservation window is not within the time period to conclude that the parking site has been prematurely vacated, the control system will check for the vehicle in the parking site when the threshold time is reached 522b. As explained below, when the hookup pedestal is deactivated, the control system and/or reservation system automatically determines the time to the start of the parking site's next reservation and makes the parking site available for a new reservation in the reservation system's inventory of open sites. As with the other periods of time that are used and evaluated in the reservation and control systems, the times can be changed in the backend data entry, such as in the management dashboard for the reservation and/or control systems.

With the deactivation of the utility services for the parking site, the control system and/or reservation system can evaluate the time remaining before the start of the window for the next scheduled reservation relative to a minimum reservation time period (Z hours) to determine whether there is sufficient time to schedule one or more intervening reservations. For example, if the minimum reservation time period is twelve (12) hours, and the last guest has departed early, if the next start of a reservation window greater than twelve (12) hours from the early termination of the last reservation window, there is sufficient time to provide a vacancy for the open time where there is no scheduled reservation. Accordingly, when there is sufficient time for an intervening reservation, the open time for the parking site is made available for a new reservation in the reservation system's inventory of open sites. Preferably, the rental agreement includes a notice that if the parking site is left vacant for more than a certain period of time, the parking site can be considered open and available for another reservation.

It will be appreciated that some of the innovative features in the integration of the reservation system with the automated control system for the multiservice hookup pedestals can be incorporated into current RV parking facilities as a retrofit improvement. For example, although the innovative techniques for confirming arrivals and determining departures are most useful for RV parking facilities that do not require any gate, as explained above, these same techniques can be used in parking facilities that have a gate. With a gated parking facility, when the control system requires the arriving party to provide positive identification, the identification can be a unique code provided to the guest on their return receipt which the guest enters into a keypad at the gate. For those parking facilities that have a data entry point at the entrance, it will be appreciated that guests may not always report when they are departing. Accordingly, whenever a vehicle exits the facility, the control system can evaluate the data from the line-load sensors and determine which parking sites have an amperage draw and should remain active and which parking sites do not have an amperage draw to follow the process described above for determining whether or not a parking site should be deactivated and returned to the reservation system's inventory of open sites that are available for a new reservation. It will also be appreciated that whenever a guest departs a parking facility, machine vision can be used to determine the license plate of the departing vehicle and can be evaluated in combination with the vehicle sensors and the line-load sensors according to the present invention to confirm the departure.

Another logic path can be used for any holdover guests who have remained in their parking site past the end of their corresponding reservation windows. To help avoid this situation, when a guest's vehicle remains in the parking site towards a prescribed terminal time period until the end of the reservation window (time to window end <W hours) 526, the control system and/or reservation system can automatically send the guest a reminder that the reservation window will end within the specified time period and that the utility services will be deactivated at that time 528. Preferably, the prescribed terminal time period is less than the prescribed end departure period (W<Y). In the situation where the start of the next reservation for the parking site is greater than a specified time, such as the minimum reservation window (Z hours) 530, the guest can be offered the option to extend their reservation window 532a by some time that would be greater than the minimum reservation window and would be less than the time to start of the next reservation (Q time). If the guest pays for an extension to the reservation the end of the reservation window is adjusted accordingly 532b.

For any guest that is a holdover and remains in the parking site when the reservation window comes to its terminal end 534, the control system deactivates the utility services provided through the hookup pedestal 536 and follows the same general process described above for a freeloader. The difference with the freeloader and the holdover guest is the reservation system has the contact information for the holdover guest; accordingly, at the same time that the utility services are deactivated, the attendant responsible for the RV parking facility with the holdover guest is provided with the holdover guest's contact information for a wellbeing check and resolve the holdover issue before the next guest arrives at the parking site 538. Of course, if there are other parking sites which are available (open but inactive) and the next guest for the parking site arrives before the holdover issue is resolved, the attendant can manually override the automated control system and activate the available open parking site for the next guest until the holdover issue is resolved. For any problem guests who have violated the terms of service for the parking facility and/or may be bothering other guests at the parking facility or otherwise creating a nuisance, a similar process can be used with a manual override to deactivate the utility services at the parking site and flash the warning light at the parking site.

The present invention solves a need for automated control of RV parking facilities that can be located in or very near major cities close to the interstate highways. The lack of such facilities makes it a challenge for transient RV travelers who want short-term parking sites along waypoints between longer-term destinations or who want to stay close to or within a city for attractions, business, or to be close to a loved one in a hospital. Most traditional campgrounds are almost always a significant distance from an interstate highway and larger cities because they mainly exist as destinations for those who camp at a campground or park there to visit other nearby natural recreational sites. Traditional campgrounds generally contain extra recreational aspects, such as swimming pools, shower houses, playgrounds, rivers, lakes, convenience stores and so on, which are not typically used by the transient RV travelers looking for a short-term stay between destinations or for a stay in or near a large city. The cost of land in and near large cities is at a premium, and these extra amenities result in additional costs for the land. Additionally, traditional campgrounds with extra amenities require a staff of people onsite to tend to all of the services and functions involved. Accordingly, by maximizing the use of the lot for RV parking and hookup services, minimizing the use of the lot for communal services, and automating the control of the utility services at the parking sites, thereby eliminating the need for onsite staff (i.e., remote control and automated systems), the present invention provides an option that had not been previously available because the lack of technology systems according to the present invention made such RV parking facilities financially untenable.

The automated systems and remote control features of the present invention significantly reduce labor costs and other costly services and functions from the base cost for parking with hookup services. The labor and cost savings allows RV parking facilities that use the present invention to operate in real estate locations of higher value that are closer to or within larger cities with higher traffic adjacent to major interstate highways where commercialized attractions, restaurants, fueling stations, shopping and entertainment exists while being economically competitively priced when compared to traditional campground parking sites and similar traditional hospitality businesses, such as hotels. Automation also allows for shorter term rentals, such as a twelve (12) hour rental period for transient travelers that want a safe place to sleep while parked in a parking site with full utility services in the hookup, rather than the traditional full day rental requirement. In the situation where there is an outage in the communications to one or more of the parking facilities, the local PLCs can function in a failsafe mode of operation until communication service is restored or an attendant or a maintenance service provider can provide local control. Preferably, the failsafe operation is status quo so that the multiservice hookup pedestals that had been active remain active, and the multiservice hookup pedestals that had been inactive remain inactive.

The automated and remote control of the utility services provided through the hookup pedestals is also beneficial for using existing parking facilities of retail stores and service provides to the RV community who have enough space in their parking lots to add the multiservice hookup pedestals for the utility services. The innovative automated and remote control features of the present invention are also beneficial to retail stores and the service providers who may want to provide hookup pedestals with only electric utility service. Accordingly, for these nontraditional RV parking facilities that take advantage of the automation provided by the present invention, the vehicle sensors are extremely important. Rather than using a distributed set of sensors at each one of the parking sites, nontraditional RV parking facilities and even some RV parking facilities, including those that may be retrofitted, may want to use a centralized sensor array, such as machine vision that can use one or more digital cameras in operative communication with a computer processor to positively identify when a parking site is vacant and when a parking site is occupied. For those facilities that have a front gate, the instructional signage can include a generic code that allows visitors, service providers, and first responders to enter the parking facility without any activation of a hookup pedestal. Additionally, a remote attendant could provide maintenance service providers with a code that would activate one or more hookup pedestals for maintenance and/or repair.

The automated functions of the present invention services can be modified to suit a particular need or desire. For example, as indicated above, some parking facilities may want to positively identify guests when they arrive. In some cases, prior to activating the parking site, the system may automatically send a text message or email or may place an automated phone call or use other communication means with the expected guest to request a positive affirmation which would confirm that the expected guest is in vehicle that has arrived at the parking site. In addition to the positive identification examples described above, the automated systems of the present invention can provide the guest with a confirmation number upon the arrival of a vehicle, and if the vehicle belongs to the guest, they can enter the confirmation number through any of the electronic communication mechanisms described above. As explained above, it is possible that an arrival may be an expected guest who has entered the wrong parking site and needs to be guided to the correct parking site. Additionally, it is possible that a guest at one parking site may be temporarily using another parking site for a secondary vehicle. Of course, it is also possible that the vehicle belongs to an attempted freeloader which the control system helps the parking site attendant(s) manage with automated protocols.

As indicated above, it is also possible for the system to incorporate automated electronic communications for activation and deactivation of the hookup pedestal upon the upon the guest's confirmed arrival and confirmed departure, respectively, such as with a proximity beacon that uses Bluetooth data signals or some other short-range wireless communication protocol. When the guests enter their mobile phone numbers into the computerized reservation system for their reservation, they can opt into the automated communications with the control system and enable their smartphone to automatically share location information data with the control system so that the control system can evaluate the guest's proximity to the parking facility at a prescribed period before and even a period after the reservation window's start time. For those guests who have a mobile phone that is not a smartphone but is instead a standard cellphone without any Bluetooth data communications or texting capability, the guest can either use the call in option or may provide authorization for the control system to either use a cellphone pinging service to determine the guest's location or obtain the guest's location using "emulated cell tower" technology where legal, such as the StingRay and/or Kingfish cell site simulator products by Harris Corporation (or other similar products, such as TriggerFish, Gossamer, Amberjack, Hailstorm, and Harpoon).

As indicated above, when the control system determines that the guest is entering within the parking facility's proximity sensor field 138, i.e., the operative distance of the proximity sensor 136 with the proximity beacon 134, the control system can seek the positive identification as confirmation that the guest is arriving and the hookup pedestal should be activated. For those guests who have authorized an automatic handshake and data transfer between their smartphone and the control system, this positive identification could be an automatic communication of a code that the guest's phone had received from the computerized reservation system when the parking site had been reserved or may have received at some prescribed time before the reservation window's start time. For other guests, the electronic communications that are described above can be used to manually enter the code. Similarly, when the control system determines that the guest's recreational vehicle has departed the parking site and has moved beyond the proximity of the parking facility, the control system can query the guest through the mobile phone identified in the reservation request to inquire whether or not the guest will be returning or if the parking site is being vacated. If the guest had already entered a departure notification into the app on the smartphone or other electronic communication and computing device, the control system can automatically set the parking site to the vacated status when the vehicle departs, even before the recreational vehicle has moved beyond the proximity of the parking facility.

In the potential freeloader situation discussed above, the control system may notify an offsite attendant and automatically pull up the camera video feed for the parking facility that shows the parking site in question. The control system may also guide the attendant in taking the appropriate action to have the vehicle moved to the correct parking site, such as in the case of a guest entering the wrong parking site by mistake, or removed entirely from the parking facility, such as in the case of a vehicle which has no reservation an is an attempted freeloader. Sometimes, a nearby guest might occupy part of another parking site in which case they will be contacted and dealt with appropriately. If it is an attempted freeloader, the local tow company can be called and possibly the local police depending on what is found when viewing the video record. As indicated above, in the case of a freeloader, the tow truck operator can be authorized to demand the payment of a minimal parking fee and service fee to pay for the dispatch of the tow truck to the facility. Whatever the case may be, it all happens because of the vehicle sensors in the parking facility and the control system's automated exchange of information with the reservation system.

The automation protocols that are described above for differentiating between a potential freeloader situation and an early guest arrival situation could include additional logic paths at selected stages of the processes. In the first stage, the control system can automatically check at a prescribe amount of unauthorized occupancy grace period, preferably shorter than the minimum rental time by an order of magnitude, such as a fifteen (15) minute period as compared to half a day rental window, to determine if there is a pending reservation for the parking site within a prescribed time period that is preferably between the unauthorized occupancy grace period and the minimum rental time, such as a three (3) hour period from the start of the first stage alert. If there is a pending guest reservation for the parking site, the control system automatically generates an electronic notice, such as an email and/or text that is communicated to the guest with copies to designated system accounts. The electronic notice requests that the guest respond with their status as either having arrived early in the parking site or not in the parking site/not yet arrived. In the situation where the guest responds that they have arrived early, the electronic notice asks the guest to select a link to automatically edit their arrival time for the reservation to activate the hookup pedestal. For a guest that has not yet arrived, the electronic notice asks the guest to select a different link that will activate the second stage alert sooner than the standard prescribed time following the grace period that the control system again checks the parking site for the unauthorized vehicle, such as a twenty (20) minute period, to determine if the second stage alert should be sent to the attendant for the parking facility.

When a parking site enters the second stage, the control system automatically sends electronic notices to designated parties, such as contracted third party contractors like the towing company, taxi company, or any other type of service provider, employee, attendant or staff member that can be available 24/7 to immediately dispatch to the parking facility to deal with the freeloader following standard protocols. The protocols could include a service charge for a non-responding pending guest that arrived early and triggered the alerts. As indicated above, a freeloader can be charged the minimal parking fee and the service fee. Additionally, the police may be called if the freeloader refuses to pay and/or to provide their identity. During this period, the freeloader may continue to be charged for the additional time required for the service until the information is provided and the issue is resolved. The protocols described herein are exemplary in nature, and there can be variations in the protocols for handling a variety of particular situations.

The automated system of the present invention enables guests to come to a parking facility without having to personally interact with anyone. Guests can reserve their parking sites, pay for the parking sites, enter into a user agreement, and receive their receipts and instructions for the entire transaction electronically. Guests can proceed directly to their assigned parking sites where power, water and sewer access are all made available to the guest automatically with a remote control system that operates in conjunction with local sensors and video cameras that monitor the parking facility and smart switches and smart valves. The hookup services continue to be provided to each guest for the time period of their reservation. Preferably, guests are allowed into the parking facility without encountering a gate or any barrier of any kind which allows for local delivery of food and other service providers or unhindered visits and appointments with local friends, family or business matters. Once onsite, the utilities become available automatically, and when the guest leaves there is no checkout required or obstacle to leaving at will. Guests can also purchase blocks of time to use at will in any park that they choose and that have a vacancy. The guests can come and go from the parking facilities on demand and would only pay for the time that they use. When buying blocks of time, the guests may be allowed a lower minimum time period for a stay. For example, if the standard minimum stay is twelve (12) hours, guests that pay for blocks of time may only be required to pay for two (2) hours. This might allow a guest to stop in a city and have a meal at a restaurant or to allow the driver and a passenger to cook a meal together while parked rather than having the passenger cook while the driver continues driving.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, although the preferred embodiment does not include a microphone or speaker in the hookup pedestal, such as described in US Pat. App. Pub. No. 2003/0004792 which is incorporated by reference herein, because the remote attendant would typically be speaking with the guests through their mobile phones, the microphone and speaker may be helpful in some sites so that the remote attendant can help guests who have not made a reservation online and can also warn trespassers to leave or their vehicle will be towed. Additionally, it will also be appreciated that aspects of the present invention could be used for other guests who reserve parking sites for their vehicles that require hookup services, such as boats at marinas and electric vehicles (EVs) at hotels, restaurants, hospitals, sporting arenas, attractions, entertainment places, city, state or national parks, and all other waypoints. As a particular example of EVs, the integrated automated reservation and control system combined with the hookup pedestal for electrical service (not even including the potable water service or sewer service) is an innovative improvement over the self-service point of purchase operations that are currently required. Thus, the breadth and scope of the present invention should not be limited by any of the above-described exemplary embodiments, but should be defined only in accordance with the following claims appended hereto and their equivalents.

There are numerous recreational vehicle parking facilities that could benefit from the advances of the present invention, including some facilities that are located in or near cities, facilities that are located along highways, facilities that are located around military bases, and even retrofitting and improving campground facilities such as Kampgrounds of America® (KOA) sites that may be in remote locations. It will be appreciated that the RV Self-Park® business model could be beneficially used by attractions, national parks, theme parks, resorts, stadiums, hospitals, RV service providers, and even retail stores that have large parking lots that are not always full and can change a portion of the lot for RV parking with the hookup pedestals and remote control and automated systems of the present invention. Additionally, with regard to improving EV charging stations, the present invention's integrated computerized reservation system and control system would allow EV owners to plan longer trips with the security of knowing that they will have an available charging station on their arrival at their reserved parking site at their corresponding reservation time(s). Although potable water service and sewer service would not be required in the hookup pedestal for the EV charging station, it may be desired to include an air compressor with an air hose and integrated tire pressure gauge that the guest could use to check their EV's tire pressure and fill tires with a low pressure condition. Additional diagnostic services could be provided through the EV charging multiservice hookup pedestal, such as a battery health check and an interface with the EV's maintenance system.

What is claimed is:

1. A method for automatically controlling electric power service to hookup pedestals in a parking facility for recreational vehicles, the method comprising the steps of:
   receiving a reservation request in a computerized reservation system from a guest for a vehicle, wherein the reservation request is comprised of a reservation period spanning a reservation start time to a reservation end time;
   automatically assigning the vehicle to a reserved parking site with the computerized reservation system according to the reservation request;
   automatically communicating the reservation request from the computerized reservation system to a parking site control system;
   monitoring the reserved parking site with the parking site control system in operative communication with a first sensor providing sensor data indicating an arrival of the vehicle; and
   providing electric power service to a multiservice hookup pedestal, wherein the multiservice hookup pedestal comprises an electrically powered latch for securing a sewer inlet cover in a closed position and a manual switch to release the electrically powered latch allowing the sewing inlet cover to move into an open position.

2. The method of claim 1, wherein the first sensor is a vehicle sensor, wherein the sensor data is comprised of a vacant status during a first time and an occupied status during a second time period, wherein the sensor data is communicated from the vehicle sensor to the parking site control system, wherein the parking site control system determines the arrival when the sensor data changes from the vacant status to the occupied status, and wherein the reservation request is further comprised of contact information for the guest and vehicle information for the vehicle.

3. The method of claim 1, further comprising the step of receiving in the multiservice hookup pedestal an actuation of the manual switch, wherein the electrically powered latch for the sewer inlet cover is released when the manual switch is actuated.

4. The method of claim 1, further comprising the step of communicating an activation signal from the parking site control system to a smart switch for a multiservice hookup pedestal in the reserved parking site upon the arrival of the vehicle.

5. The method of claim 1, further comprising the steps of:
   automatically comparing in the parking site control system a time of the arrival of the vehicle with the reservation start time;
   determining with the parking site control system that the time of the arrival is before a prescribed early arrival period; and
   modifying the reservation start time to correspond with the time of the arrival.

6. The method of claim 1, further comprising the steps of:
   automatically providing the guest with a unique code as a positive identification of the reserved parking site; and
   receiving the unique code in the parking site control system from the guest upon the arrival of the vehicle in the reserved parking site.

7. The method of claim 1, further comprising the steps of:
monitoring the reserved parking site with the parking site control system in operative communication with the first sensor for a departure of the vehicle;
determining with the parking site control system that a time of the departure is within a prescribed departure period before the reservation end time; and
automatically communicating a deactivation signal from the parking site control system to a smart switch for the multiservice hookup pedestal in the reserved parking site upon the departure of the vehicle during the prescribed departure period, wherein the deactivation signal opens a smart switch to terminate electric power service.

8. The method of claim 7, further comprising the steps of
determining with at least one of the parking site control system and the computerized reservation system an open time period to a start of a next reservation start time for the parking site; and
automatically making the parking site available for a new reservation in the computerized reservation system when the open time period is greater than a minimum reservation time period.

9. The method of claim 7, further comprising the steps of
monitoring in the parking site control system an operation of the multiservice hookup pedestal according to a second sensor, wherein the first sensor is a vehicle sensor, wherein the second sensor is a line-load sensor, and wherein the sensor data from the vehicle sensor is comprised of a vacant status during a first time period and an occupied status during a second time period;
communicating the sensor data from the vehicle sensor to the parking site control system; and
determining with the parking site control system the departure when the sensor data changes from the occupied status to the vacant status.

10. The method of claim 9, further comprising the steps of:
measuring electrical power usage data through the multiservice hookup pedestal with the line-load sensor;
automatically determining with the parking site control system no electrical power usage has occurred for a prescribed period of time after the sensor data from the vehicle sensor changes from the occupied status to the vacant status;
confirming with the parking site control system that the deactivation signal should be sent to a smart switch for the multiservice hookup pedestal according to the sensor data from the vehicle sensor, the time of the departure being within prescribed departure period before the reservation end time, and the determining of no electrical power usage for the prescribed period of time;
determining with at least one of the parking site control system and the computerized reservation system an open time period to a start of a next reservation start time for the parking site; and
automatically making the parking site available for a new reservation in the computerized reservation system when the open time period is greater than a minimum reservation time period.

11. The method of claim 7, further comprising the steps of:
determining with the parking site control system that the vehicle has not departed within a prescribed terminal time period before the reservation end time, wherein the prescribed terminal time period is less than the prescribed departure period; and
automatically sending a departure time reminder to the guest when the vehicle has not departed by the prescribed terminal time period.

12. The method of claim 1, further comprising the steps of:
determining with the parking site control system that an unregistered vehicle has arrived in the reserved parking site before a prescribed early arrival period; and
automatically communicating a freeloader warning signal from the parking site control system to at least one of a display, a speaker, and a light in the multiservice hookup pedestal in the reserved parking site for a time period upon the arrival of the unregistered vehicle.

13. A method for automatically controlling electric power service to hookup pedestals in a parking facility for recreational vehicles, the method comprising the steps of:
providing electric power service to a multiservice hookup pedestal, wherein the multiservice hookup pedestal comprises an electrically powered latch for securing a sewer inlet cover in a closed position and a manual switch to release the electrically powered latch allowing the sewer inlet cover to move into an open position;
generating vehicle sensor data with a vehicle sensor corresponding to a reserved parking site for a vehicle, wherein the vehicle sensor data is comprised of a vacant status during a first time period and an occupied status during a second time period;
monitoring the vehicle sensor data with a parking site control system;
determining with the parking site control system a departure of the vehicle from the reserved parking site when the vehicle sensor data changes from the occupied status to the vacant status;
determining with the parking site control system that a time of the departure is within a prescribed departure period before the reservation end time; and
communicating a deactivation signal from the parking site control system to a smart switch for the multiservice hookup pedestal in the reserved parking site upon the departure of the vehicle during the prescribed departure period, wherein the deactivation signal opens the smart switch to terminate electric power service to the multiservice hookup pedestal.

14. The method of claim 13, further comprising the steps of:
receiving a reservation request with a reservation start time and a reservation end time in a computerized reservation system from a guest;
determining with at least one of the parking site control system and the computerized reservation system an open time period to a start of a next reservation start time for the parking site; and
automatically making the parking site available for a new reservation in the computerized reservation system when the open time period is greater than a minimum reservation time period.

15. The method of claim 13, further comprising the step of receiving in the multiservice hookup pedestal an actuation of the manual switch, wherein the electrically powered latch for the sewer inlet cover is released when the manual switch is actuated.

16. The method of claim 13, further comprising the steps of:
determining with the parking site control system that the vehicle has not departed within a prescribed terminal time period before the reservation end time, wherein the prescribed terminal time period is less than the prescribed departure period; and automatically sending a departure time reminder to the guest when the vehicle has not departed by the prescribed terminal time period.

17. A method for automatically controlling electric power service to hookup pedestals in a parking facility for vehicles, the method comprising the steps of:

receiving a reservation request in a computerized reservation system from a guest for a vehicle, wherein the reservation request is comprised of a reservation start time and a reservation end time;

automatically assigning the vehicle to a reserved parking site with the computerized reservation system according to the reservation request;

automatically communicating the reservation request from the computerized reservation system to a parking site control system;

monitoring the reserved parking site with the parking site control system in operative communication with a first sensor providing sensor data indicating a change in status of the parking site, wherein the change in status is either an arrival of the vehicle or a departure of the vehicle;

providing electric power service to a multiservice hookup pedestal, wherein the multiservice hookup pedestal comprises an electrically powered latch for securing a sewer inlet cover in a closed position and a manual switch to release the electrically powered latch allowing the sewer inlet cover to move into an open position; and remotely communicating a deactivation signal from the parking site control system to a smart switch for the hookup pedestal in the reserved parking site upon determining a vehicle is a freeloader situation, wherein the deactivation signal opens the smart switch to terminate electric power service, and wherein the electrically powered latch is biased in a locked configuration.

18. The method of claim 17, further comprising the steps of:

monitoring in the parking site control system an operation of the hookup pedestal according to a second sensor, wherein the first sensor is a vehicle sensor, wherein the second sensor is a line-load sensor, and wherein the sensor data from the vehicle sensor is comprised of a vacant status during a first time period and an occupied status during a second time period;

communicating the sensor data from the vehicle sensor to the parking site control system;

determining with the parking site control system the arrival when the sensor data changes from the vacant status to the occupied status; and determining with the parking site control system the departure when the sensor data changes from the occupied status to the vacant status.

19. The method of claim 17, further comprising the step of receiving in the multiservice hookup pedestal an actuation of the manual switch, wherein the electrically powered latch for the sewer inlet cover is released when the manual switch is actuated.

20. The method of claim 17, further comprising the steps of:

monitoring with the parking site control system a proximity sensor for the parking facility, wherein the proximity sensor operatively communicates with a proximity beacon when the proximity beacon is within a prescribed distance from the proximity sensor, wherein the proximity beacon is in a smartphone that is associated with the vehicle in the reservation request;

providing a site status indicator for the parking site within a line of site of the hookup pedestal;

sending a first instruction from the control system to the site status indicator to provide a first status indicator when the parking site is vacant and available for rental;

sending a second instruction from the control system to the site status indicator to provide a second status indicator when the parking site is occupied and the hookup pedestal is in proper working order;

sending a third instruction from the control system to the site status indicator to provide a third status indicator when the parking site is vacant and is within a prescribed period of time to a start of a next reservation start time;

sending a fourth instruction from the control system to the site status indicator to provide a fourth status indicator when there is an issue with at least one of an occupancy of the parking site and an operation of the hookup pedestal; wherein the issue with the occupancy is an occupied status when there is no current reservation, and wherein the issue with the operation is the hookup pedestal is not in proper working order; and showing on a display screen a representation of the site status indicator corresponding with each one of a plurality of parking sites in the parking facility.

* * * * *